United States Patent
Fogarty, Jr.

(10) Patent No.: US 11,672,390 B2
(45) Date of Patent: Jun. 13, 2023

(54) VACUUM CLEANER MOTOR ASSEMBLIES AND METHODS OF OPERATING SAME

(71) Applicant: Emerson Electric Co., St. Louis, MO (US)

(72) Inventor: Thomas E. Fogarty, Jr., Alton, IL (US)

(73) Assignee: Emerson Electric Co., St. Louis, MO (US)

( * ) Notice: Subject to any disclaimer, the term of this patent is extended or adjusted under 35 U.S.C. 154(b) by 287 days.

(21) Appl. No.: 17/096,786

(22) Filed: Nov. 12, 2020

(65) Prior Publication Data
US 2021/0137327 A1 May 13, 2021

Related U.S. Application Data

(60) Provisional application No. 62/934,693, filed on Nov. 13, 2019.

(51) Int. Cl.
*A47L 5/36* (2006.01)
*A47L 9/10* (2006.01)
(Continued)

(52) U.S. Cl.
CPC ............ *A47L 5/365* (2013.01); *A47L 9/10* (2013.01); *A47L 9/22* (2013.01); *A47L 9/28* (2013.01);
(Continued)

(58) Field of Classification Search
CPC .......... A47L 9/22; A47L 9/2842; A47L 5/365; A47L 9/10; A47L 9/28; F04D 25/0693; F04D 29/4226
See application file for complete search history.

(56) References Cited

U.S. PATENT DOCUMENTS 4,550,277 A 10/1985 Carney
5,274,878 A 1/1994 Radabaugh et al.
(Continued)

FOREIGN PATENT DOCUMENTS

CA 2377650 A1 11/2002
CA 2369390 A1 7/2003
(Continued)

OTHER PUBLICATIONS

Yadav, Ankit Tejbahadur et al., Wireless Automatic Floor Cleaning and Safety Indicator Robot, International Research Journal of Engineering and Technology, Jun. 2018, pp. 3103-3106, vol. 5, No. 6.

(Continued)

*Primary Examiner* — Marc Carlson
(74) *Attorney, Agent, or Firm* — Armstrong Teasdale LLP

(57) ABSTRACT

A vacuum cleaner includes a housing, a debris chamber defined within the housing, and a motor assembly connected to the housing and operable to generate airflow through the debris chamber. The motor assembly includes a motor, an impeller, an impeller housing, and a controller. The impeller is connected to the motor and operable to generate airflow upon operation of the motor. The impeller housing is constructed of an electrically-conductive material. The impeller is positioned within the impeller housing. The controller includes a circuit board assembly. The circuit board assembly including a common circuit, and the impeller housing is electrically connected to the common circuit.

17 Claims, 13 Drawing Sheets

(51) Int. Cl.
*A47L 9/22* (2006.01)
*A47L 9/28* (2006.01)
*F04D 25/08* (2006.01)
*F04D 29/42* (2006.01)
*H02P 29/68* (2016.01)
*G05B 19/4155* (2006.01)

(52) U.S. Cl.
CPC ......... *A47L 9/2831* (2013.01); *A47L 9/2842* (2013.01); *A47L 9/2857* (2013.01); *A47L 9/2889* (2013.01); *F04D 25/08* (2013.01); *F04D 29/4246* (2013.01); *G05B 19/4155* (2013.01); *H02P 29/68* (2016.02); *G05B 2219/39558* (2013.01)

(56) References Cited

U.S. PATENT DOCUMENTS

| | | | |
|---|---|---|---|
| 5,507,067 A | 4/1996 | Hoekstra et al. | |
| 5,515,572 A | 5/1996 | Hoekstra et al. | |
| 5,542,146 A | 8/1996 | Hoekstra et al. | |
| 5,597,979 A * | 1/1997 | Courtney | H05K 9/0043 174/378 |
| 6,054,647 A * | 4/2000 | Ridener | H05K 9/009 174/394 |
| 6,140,575 A * | 10/2000 | Gunten | H05K 9/0045 361/753 |
| 6,163,454 A * | 12/2000 | Strickler | H05K 9/0041 361/818 |
| 6,255,581 B1 * | 7/2001 | Reis | H05K 9/0015 29/850 |
| 6,351,872 B1 | 3/2002 | McCormick | |
| 6,484,352 B2 | 11/2002 | Huebsch et al. | |
| 6,488,475 B2 * | 12/2002 | Murata | F04D 29/5806 417/423.1 |
| 6,553,611 B2 | 4/2003 | Huebsch et al. | |
| 6,664,748 B2 | 12/2003 | Kushida et al. | |
| 6,706,964 B2 * | 3/2004 | Igarashi | H05K 9/0022 174/250 |
| 6,972,369 B2 * | 12/2005 | Megason | G06F 1/184 174/355 |
| 6,986,669 B2 * | 1/2006 | Kawai | H01R 13/245 174/267 |
| 7,237,298 B2 | 7/2007 | Reindle et al. | |
| 7,309,365 B2 | 12/2007 | Yuasa et al. | |
| 7,403,360 B2 | 7/2008 | Cunningham et al. | |
| 7,640,621 B2 | 1/2010 | Cloud et al. | |
| 7,712,182 B2 | 5/2010 | Zeiler et al. | |
| 7,958,594 B2 | 6/2011 | Cunningham et al. | |
| 8,099,825 B2 | 1/2012 | Zahuranec et al. | |
| 8,479,355 B2 | 7/2013 | Seyfettin et al. | |
| 8,975,852 B2 | 3/2015 | Petersson et al. | |
| 9,055,848 B2 | 6/2015 | Liu et al. | |
| 9,078,351 B2 * | 7/2015 | Matano | H05K 9/0039 |
| 9,089,250 B2 | 7/2015 | Stein | |
| 9,195,881 B2 | 12/2015 | Conrad | |
| 9,314,138 B2 | 4/2016 | Conrad | |
| 9,693,667 B2 | 7/2017 | Cunningham et al. | |
| 9,700,189 B2 | 7/2017 | Pilch et al. | |
| 9,943,206 B2 | 4/2018 | Yang et al. | |
| 9,962,054 B2 | 5/2018 | Seo et al. | |
| 10,022,028 B2 | 7/2018 | Tsuboi et al. | |
| 10,034,143 B2 | 7/2018 | Gatter | |
| 10,148,155 B2 * | 12/2018 | Wilkinson | H02K 5/225 |
| 10,272,828 B2 | 4/2019 | White et al. | |
| 10,362,913 B2 | 7/2019 | Gatter et al. | |
| 10,470,634 B2 | 11/2019 | Ham et al. | |
| 10,555,655 B2 | 2/2020 | Jeong | |
| 10,582,824 B2 | 3/2020 | Cunningham | |
| 10,646,091 B2 | 5/2020 | Schnittman et al. | |
| 10,667,664 B2 | 6/2020 | Sheikh et al. | |
| 10,678,236 B2 | 6/2020 | Jung et al. | |
| 2005/0235452 A1 | 10/2005 | Cloud | |
| 2006/0101605 A1 | 5/2006 | Fujiwara | |
| 2006/0204383 A1 | 9/2006 | Kushida et al. | |
| 2007/0151068 A1 | 7/2007 | Zahuranec et al. | |
| 2007/0283521 A1 | 12/2007 | Foster et al. | |
| 2008/0282494 A1 | 11/2008 | Won et al. | |
| 2009/0073672 A1 * | 3/2009 | Chen | H05K 9/0084 174/351 |
| 2010/0210452 A1 | 8/2010 | Bode et al. | |
| 2012/0038309 A1 | 2/2012 | Zahora et al. | |
| 2012/0161570 A1 * | 6/2012 | Schutten | H02K 3/487 310/215 |
| 2012/0169497 A1 | 7/2012 | Schnittman et al. | |
| 2015/0327356 A1 | 11/2015 | Kjellstrom | |
| 2017/0156560 A1 | 6/2017 | Jung et al. | |
| 2017/0273528 A1 | 9/2017 | Watanabe et al. | |
| 2018/0157266 A1 | 6/2018 | Xie | |
| 2018/0210452 A1 | 7/2018 | Shin et al. | |
| 2019/0113043 A1 * | 4/2019 | Diehl | F04D 25/0606 |
| 2019/0159643 A1 * | 5/2019 | Machida | A47L 9/2857 |
| 2019/0183305 A1 | 6/2019 | Lawson et al. | |
| 2019/0191949 A1 * | 6/2019 | Hayamitsu | F04D 25/082 |
| 2019/0208975 A1 | 7/2019 | Lee et al. | |
| 2019/0212752 A1 | 7/2019 | Fong et al. | |
| 2020/0146520 A1 | 5/2020 | Caspar | |
| 2022/0279726 A1 * | 9/2022 | Ricketts | F04D 29/4226 |

FOREIGN PATENT DOCUMENTS

| | | |
|---|---|---|
| CA | 2566020 A1 | 11/2005 |
| EP | 0438827 A1 | 7/1991 |
| GB | 2237185 A | 5/1991 |
| GB | 2288115 A | 10/1995 |
| WO | 2014177171 A1 | 11/2014 |

OTHER PUBLICATIONS

Gullu, Aydin et al., Bluetooth Based Smart Vacuum Design and Implementation, Bilge International Journal of Science and Technology Research, 2019, pp. 63-66, vol. 3, No. 1.

Indra, Adiyansyah Win et al., Development of Multi-Controlled Floor Vacuum Cleaner Using RF Energy Harvesting, Journal of Engineering and Applied Sciences, Feb. 2020, pp. 3738-3742, vol. 14, No. 21.

Yatmono, S. et al., Development of Intelligent Floor Cleaning Robot, Journal of Physics: Conference Series, 2019, pp 1-8, vol. 1413.

* cited by examiner

VACUUM CLEANER MOTOR ASSEMBLIES AND METHODS OF OPERATING SAME

CROSS-REFERENCE TO RELATED APPLICATION

This application claims the benefit of U.S. Provisional Application Ser. No. 62/934,693 filed Nov. 13, 2019, entitled "VACUUM CLEANER MOTOR ASSEMBLIES AND METHODS OF OPERATING SAME," which is incorporated herein by reference in its entirety.

FIELD

The field of the disclosure relates generally to vacuum cleaners and, more particularly, to vacuum cleaner motor assemblies and methods of operating same.

BACKGROUND

Some known vacuum cleaners, and particularly the motor assemblies in such vacuum cleaners produce electromagnetic interference at levels that may be unacceptable to some users or in some industries. Further, the electromagnetic compatibility of such vacuum cleaners may be lower than desired. Some vacuum cleaners are also not capable of meeting the temperature, voltage, and current requirement of some users and industries.

Moreover, vacuum cleaners typically do not communicate information to users and may be frustrating to users. For example, some vacuum cleaners will simply shut down when the motor overheats, leaving the user unable to continue vacuuming and not knowing why the vacuum stopped.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect of this disclosure, a vacuum cleaner includes a housing, a debris chamber defined within the housing, and a motor assembly connected to the housing and operable to generate airflow through the debris chamber. The motor assembly includes a motor, an impeller, an impeller housing, and a controller. The impeller is connected to the motor and operable to generate airflow upon operation of the motor. The impeller housing is constructed of an electrically-conductive material. The impeller is positioned within the impeller housing. The controller includes a circuit board assembly. The circuit board assembly including a common circuit, and the impeller housing is electrically connected to the common circuit.

Another aspect is a motor assembly for a vacuum cleaner. The motor assembly includes a motor housing, a motor connected to the motor housing, an impeller, an impeller housing, and a controller. The impeller is connected to the motor and operable to generate airflow upon operation of the motor. The impeller housing is constructed of an electrically-conductive material, and is positioned within the impeller housing. The controller includes a circuit board assembly. The circuit board assembly includes a common circuit, and the impeller housing is electrically connected to the common circuit.

In another aspect, a method of assembling a motor assembly for a vacuum cleaner includes connecting a motor to a motor housing, connecting, to the motor, an impeller operable to generate airflow upon operation of the motor, and positioning an impeller housing constructed of an electrically-conductive material around the impeller housing. A controller comprising a circuit board assembly having a common circuit is positioned within the motor housing. The circuit board assembly includes a circuit board having a segment of conductive edge plating electrically connected to the common circuit. The impeller housing is electrically connected to the common circuit through the segment of conductive plating.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
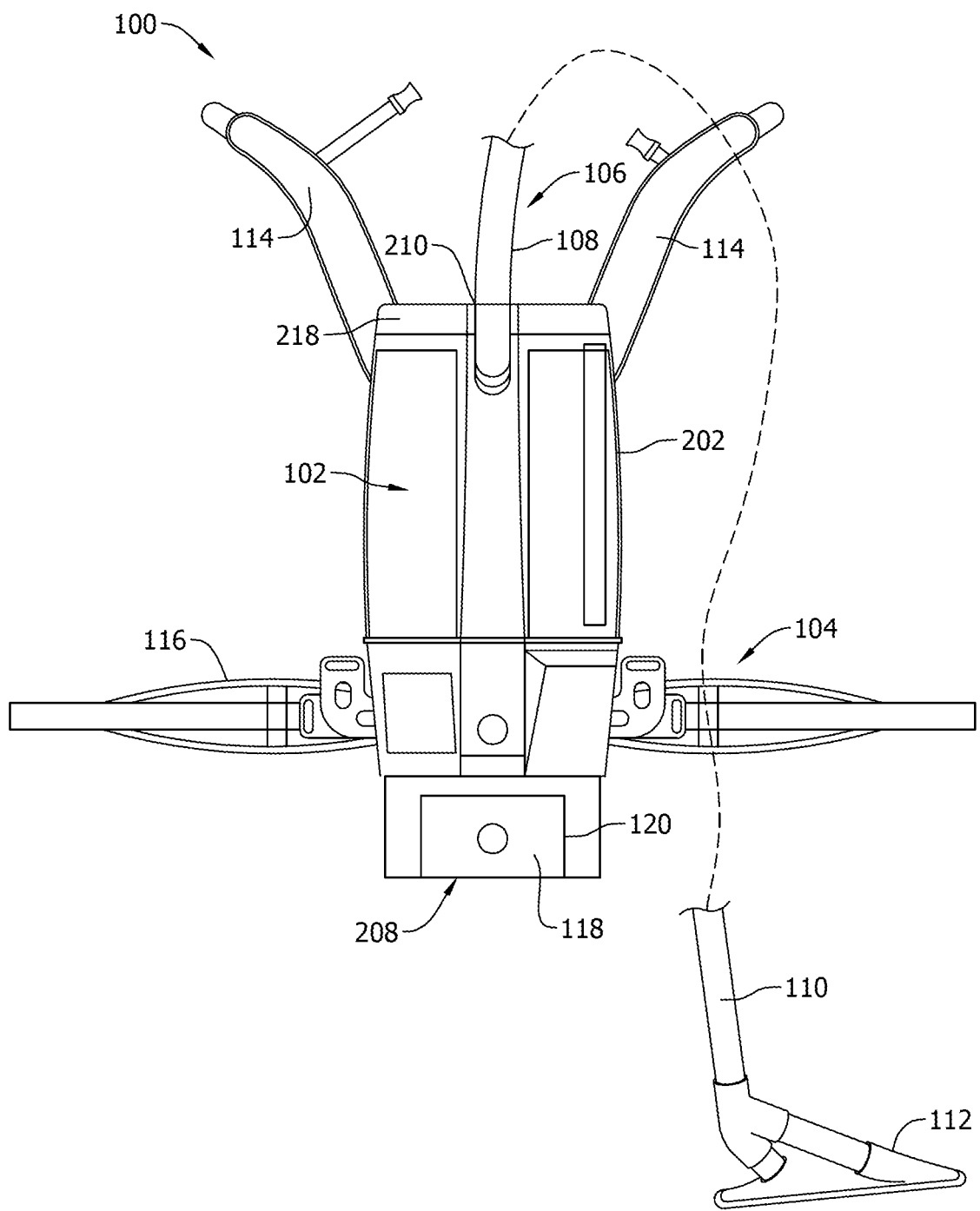
FIG. 1 is a perspective view of an example vacuum cleaner.

FIG. 1 is a perspective view of an example vacuum cleaner 100, shown in the form of a backpack vacuum cleaner. Although the vacuum cleaner 100 is shown and described herein with reference to a backpack mounted vacuum cleaner, vacuum cleaners consistent with this disclosure may be embodied in other types and in other combinations including, for example and without limitation, vehicular or automotive vacuum cleaners, wet/dry vacuum cleaners, canister vacuum cleaners, and upright vacuum cleaners. By way of example, aspects of the vacuum cleaners, such as the motor assemblies and control methods disclosed herein, may be implemented in automotive or transportation vacuum cleaners, such as those disclosed in U.S. Pat. Nos. 9,751,504; 10,328,907; and 10,099,659, the disclosures of which are hereby incorporated by reference in their entirety.

In the example embodiment, vacuum cleaner 100 includes a vacuum cleaner assembly 102 that is carried on a user's back via a harness or backpack assembly 104, and a vacuum conduit 106 connected to the vacuum cleaner assembly 102. The vacuum conduit 106 may generally include any suitable conduit for directing suction and/or forced air generated by the vacuum cleaner 100, including, for example and without limitation, vacuum hoses, vacuum wands or tubes, surface cleaning tools, and combinations thereof. In the illustrated embodiment, the vacuum conduit 106 includes a hose 108 extending from a top of the vacuum cleaner assembly 102, a vacuum cleaner wand 110 connected to the hose 108, and a vacuum cleaner floor tool 112 connected to a distal end of the wand 110.

The backpack assembly 104 is sized and shaped to be worn by a user of the vacuum cleaner 100 (e.g., on the user's back or shoulders) to facilitate carrying the vacuum cleaner 100 during use. In the illustrated embodiment, the backpack assembly 104 includes two shoulder straps 114 and a waist belt 116 for securing the backpack assembly 104 and vacuum cleaner 100 to the torso of a user. In other embodiments, the backpack assembly 104 may have any suitable configuration that enables the vacuum cleaner 100 to function as described herein.

Figure 2:
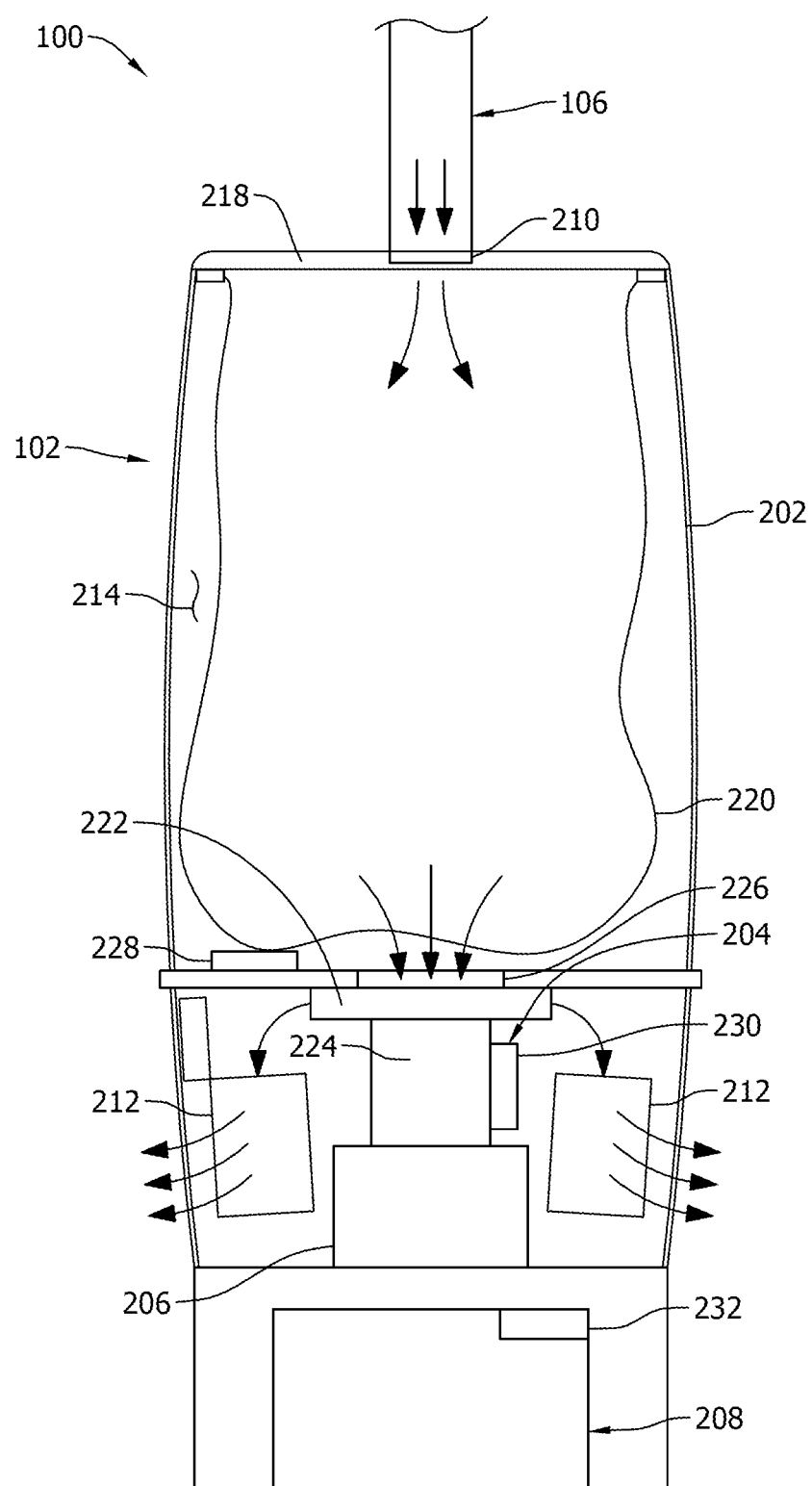
FIG. 2 is a side schematic view of the vacuum cleaner shown in FIG. 1.
Figure 3:
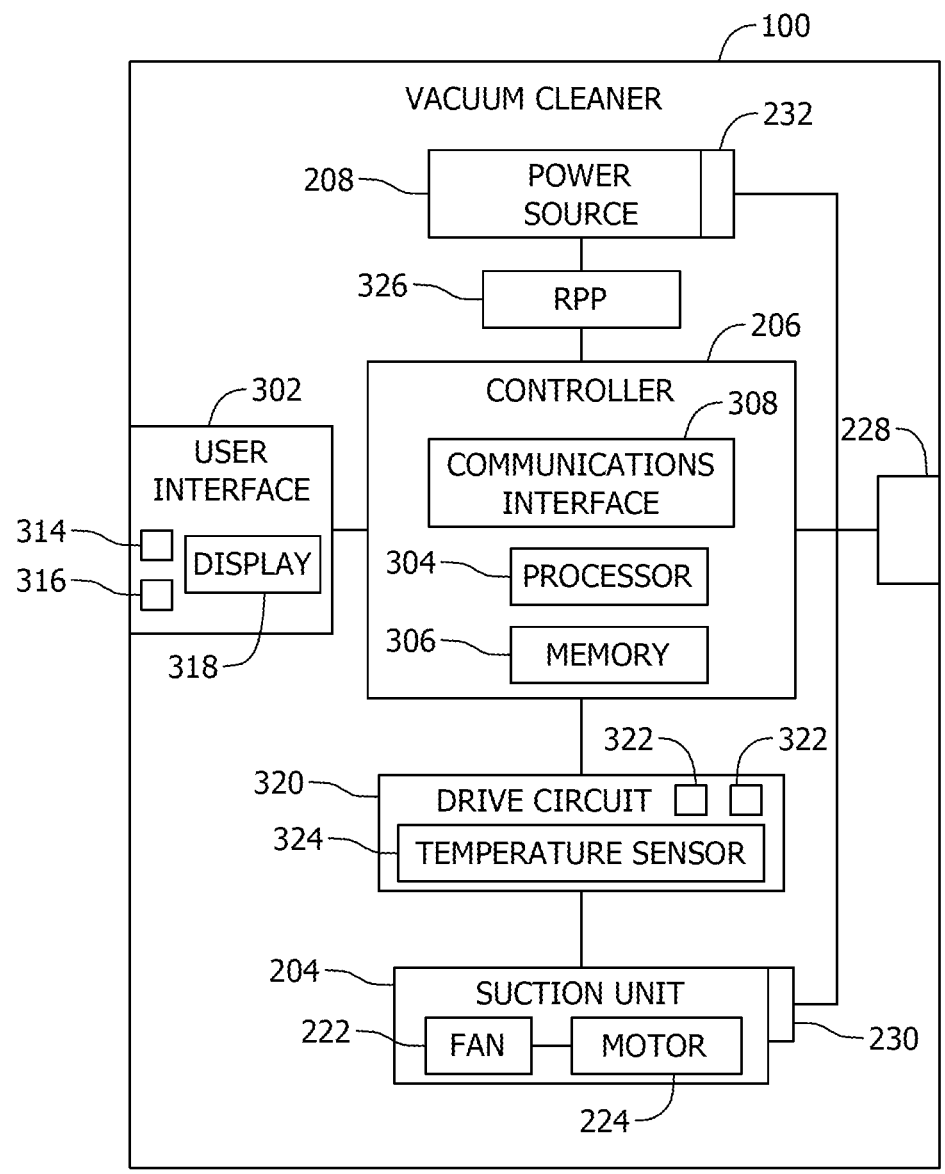
FIG. 3 is a block diagram of the vacuum cleaner shown in FIG. 1.

With additional reference to FIGS. 2 and 3, the vacuum cleaner assembly 102 includes a housing 202, a suction unit 204 enclosed within the housing 202, a controller 206, and a power source 208. The components and connections shown in FIG. 3 are a functional example only. Other embodiments may include different components, more or fewer components, components connected to different components, and/or different polarity connections.

The housing 202 defines an inlet 210, at least one exhaust or outlet 212, and a debris chamber 214 connected in fluid communication between the inlet 210 and the outlet 212. In the example embodiment, the inlet 210 is defined at a top of the housing 202, and the housing 202 includes two outlets 212 defined adjacent a bottom of the housing 202. In other embodiments, the inlet 210 and the outlet(s) 212 may be defined at any suitable portion of the vacuum cleaner 100 that enables the vacuum cleaner 100 to function as described herein. Further, the vacuum cleaner 100 may include more than or fewer than two outlets 212.

In the illustrated embodiment, the housing 202 includes an access door or lid 218 that provides access to the debris chamber 214, for example, to empty debris collected within the debris chamber 214. The inlet 210 is defined in the lid 218 in the example embodiment. Further, the example housing 202 is adapted to receive a filter 220 within the debris chamber 214 to filter out fine debris and small particles from the air flow through the housing 202. In the illustrated embodiment, the filter 220 is a bag filter, although the vacuum cleaner 100 may be operable with other types of filters, including, for example and without limitation, cartridge filters.

The suction unit 204 is operable to generate airflow (indicated by arrows in FIG. 2) through the housing 202 from the inlet 210 to the outlet 212 so as to draw debris into the debris chamber 214 through the inlet 210 by way of the vacuum conduit 106 (shown in FIG. 1). The suction unit 204 includes a fan or impeller 222 and a motor 224 operatively connected to the impeller 222 (collectively referred to herein as a "motor assembly") to drive the impeller 222 and generate airflow through the housing 202. The motor assembly is connected to the housing 202 and positioned adjacent the debris chamber 214 such that the impeller 222 receives airflow through an impeller inlet 226 defined by the housing 202. In certain embodiments, the motor assembly may also be adapted to operate in a "reverse" mode in which the motor assembly generates airflow from the outlet 212 to the inlet 210, so as to enable the vacuum cleaner 100 to operate as a blower.

The controller 206 is generally configured to control one or more operations or processes of the vacuum cleaner 100, as described further herein. In some embodiments, for example, the controller 206 receives user input from a user interface 302 of vacuum cleaner 100, and controls one or more components of vacuum cleaner 100 in response to such user inputs. The user interface 302 includes a power switch 314, a speed selection switch 316, and a display 318. The power switch 314 is a single pole single throw (SPST) momentary switch operated by the user to turn the vacuum cleaner 100 on and off. Alternatively, the power switch 314 may be a maintained switch rather than a momentary switch. The speed selection switch 316 is a dual pole dual throw (DPDT) switch operable by the user to select an operation speed of the motor 224 of the vacuum cleaner 100. The display 318 is a visual display for displaying information about the vacuum cleaner 100 to the user. In the example embodiment, the display 318 is a light emitting diode (LED). Alternatively, the display 318 may be a plurality of LEDs, a display screen (such as an LED panel, a liquid crystal display (LCD) panel, or the like), or any other display suitable for visually displaying information to the user of the vacuum cleaner 100.

In some embodiments, the controller 206 controls the supply of power from power source 208 to vacuum suction unit 204 based on user input received from the user interface 302. For example, the controller 206 operates the motor 224 in response to user input received from the power switch 314 and the speed selection switch 316. The controller 206 may regulate or control electrical power supplied to vacuum cleaner 100, such as from power source 208. For example, the controller 206 of the vacuum cleaner 100 may include one or more power converters or regulators configured to control or regulate the electrical power supplied to components of the vacuum cleaner 100, such as the motor 224 of vacuum suction unit 204. In some embodiments, for example, the controller 206 may include one or more DC power converters or regulators configured to control or regulate DC power supplied by the power source. Such power converters and regulators may be incorporated or integrated within components of the vacuum cleaner 100, such as the vacuum suction unit 204 and/or within the motor 224.

The controller 206 may generally include any suitable computer and/or other processing unit, including any suitable combination of computers, processing units and/or the like that may be operated independently or in connection within one another. The controller 206 may include one or more processor(s) 304 and associated memory device(s) 306 containing instructions that cause the processor 304 (i.e., "configure the processor" or "program the processor") to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) 306 of controller 206 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 306 may generally be configured to store suitable computer-readable instructions that, when implemented by the processor(s), configure or cause the controller 206 to perform various functions described herein including, but not limited to, controlling vacuum cleaner 100, controlling operation of vacuum suction unit 204, receiving inputs from user interface 302, providing output to an operator via user interface 302, and/or various other suitable computer-implemented functions.

The controller 206 includes a communications interface 308. Communications interface 308 allows the vacuum cleaner 100 (and more particularly, the controller 206) to communicate with remote devices and systems as part of a wired or wireless communication network. Wireless network interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired network interfaces may use any suitable wired communication protocol for direct communication including, without limitation, USB, RS232, I2C, SPI, analog, and proprietary I/O protocols. Moreover, in some embodiments, the wired network interfaces include a wired network adapter allowing the computing device to be coupled to a network, such as the Internet, a local area network (LAN), a wide area network (WAN), a mesh network, and/or any other network to communicate with remote devices and systems via the network. Controller 206 transmits and receives communications over the communication network using messages formatted according to an appropriate network communication protocol. In some embodiments, the network communication protocol is an Ethernet communication protocol or an Institute of Electrical and Electronics Engineers (IEEE) 802.11 based communication protocol. In some embodiments, the communications interface 308 includes wired and wireless communications interfaces. In some embodiments, the communications interface 308 includes a wired communication interface for communicative connection to a communication interface in an automobile.

The communications interface 308 may be used, for example, for communicating diagnostics information, providing the serial number of the vacuum cleaner 100, providing maintenance performed information, providing firmware version information, receiving firmware updates and reprogramming, and providing motor 224 operation/fault status information to a diagnostic/monitoring device, or the like.

The controller 206 and/or components of controller 206 may be integrated or incorporated within other components of the vacuum cleaner 100. In some embodiments, for example, controller 206 may be incorporated within the vacuum suction unit 204 or the motor assembly.

The power source 208 is configured to supply electrical power to components of the vacuum cleaner 100, such as the motor 224 and the controller 206, and may generally include any suitable power source that enables the vacuum cleaner 100 to operate as described herein. Suitable types of power sources include, for example and without limitation, DC power sources, such as battery packs, and AC power sources, such as mains AC electricity from a household or commercial wall outlet. A reverse polarity protection circuit 326 protects the controller 206 and other components of the vacuum cleaner from damage caused by the power source 208 being incorrectly connected to the controller 206 with the incorrect polarity. The reverse polarity protection circuit 326 will be further described with respect to FIG. 6.

The illustrated vacuum cleaner 100 is a "cordless" vacuum cleaner that includes a portable power source, shown in the form of a battery 118 removably connected to a battery receptacle 120 defined by the housing 202. The battery 118 of the example embodiment is a direct current (DC) source battery configured to supply direct current to the vacuum cleaner 100. The battery 118 may have any suitable DC battery construction that enables the vacuum cleaner 100 to function as described herein. For example, the battery may include, without limitation, one or more lithium-ion batteries, nickel-metal hydride batteries, lead-acid batteries, lithium-metal batteries, supercapacitors or other capacitor-based voltage sources, lithium nickel manganese cobalt oxide batteries, lithium nickel cobalt aluminum oxide batteries, and any other suitable DC battery construction that enables the vacuum cleaner 100 to function as described herein. In this embodiment, the battery 118 is a rechargeable lithium-ion battery that includes a plurality of lithium-ion cells.

The vacuum cleaner 100 includes a power cord for supplying AC power, converted to DC, to charge the battery, to supply power to operate the motor 224, and/or to power other operational components of the vacuum cleaner. Thus, the vacuum cleaner 100 may be selectively operated in a cordless mode, in which the battery 118 is electrically connected to the vacuum cleaner 100, and a corded mode, in which a power cord is electrically connected to the vacuum cleaner 100 and supplies AC power to the vacuum cleaner 100 (e.g., from a wall outlet). Other embodiments may be operated only from a battery or only from AC power.

The illustrated vacuum cleaner 100 also includes a plurality of sensors 228, 230, 232 connected to the controller 206. The sensors 228, 230, 232 may provide feedback to the controller 206 regarding operation of the vacuum cleaner 100, and the controller 206 may control the vacuum cleaner 100 based on feedback received from the sensors 228, 230, 232. Sensors 228, 230, and 232 may include, for example and without limitation, proximity sensors, pressure sensors, temperature sensors, voltage sensors, and active or passive current sensors.

The vacuum cleaner 100 includes a drive circuit 320 for powering the motor 224 of the suction unit 204. The drive circuit includes a plurality of switches 322 for selectively energizing coils (not shown) of the motor 224 to drive the motor 224. In the example embodiment, the switches 322 are metal oxide semiconductor field effect transistors (MOSFETs). Alternatively, any other switch suitable for driving the motor 224 may be used. For clarity of illustration, only two switches 322 are shown in FIG. 3, but the drive circuit 320 will typically include more than two switches 322 (e.g., six switches 322 for a three phase brushless DC motor), and the drive circuit 320 may include any number of switches useful to drive the motor 224. A temperature sensor 324 detects the temperature of one or more drive component associated with the motor. Specifically, temperature sensor 324 is positioned near the switches 322 to detect the temperature of the switches 322 and provide the detected temperature to the controller 206. In some embodiments, the temperature sensor 324 includes more than one temperature sensor 324, each of which is positioned near one or more different switches 322. For example, the drive circuit 320 may include one temperature sensor 324 for each switch 322, one temperature sensor 324 for each pair of switches 322, etc. In the example embodiment, the temperature sensor 324 is a thermistor thermally coupled to the switches 322 by a thermally conductive room-temperature-vulcanized (RTV) component or a thermally conductive adhesive. Alternatively, the temperature sensor 324 may be a resistance temperature detector (RTD), a thermocouple, or any other sensor suitable for measuring temperature. Although illustrated as a separate component, the drive circuit 320 may be incorporated into the controller 206, the suction unit 204, or the motor 224.

To operate the vacuum cleaner 100, the user depresses the power switch 314. In the example embodiment, the power switch 314 is a momentary switch, which sends a signal to the controller 206 only when the user depresses the power switch 314. Generally, upon receiving the signal from the power switch 314, the controller toggles the on/off state of the vacuum cleaner 100. That is, if the vacuum cleaner 100 is off, depressing the power switch 314 provides a signal that the controller 206 interprets as a request to turn on the vacuum cleaner 100. When the vacuum cleaner 100 is on, depressing the power switch 314 provides a signal that the controller 206 interprets as a request to turn off the vacuum cleaner 100.

To avoid changing the state of the vacuum cleaner 100 due to unintentional depression of the power switch 314, the controller 206 times how long the power switch 314 is depressed (referred to as the "depression time") and compares the depression time to a threshold time. If the depression time equals or exceeds the threshold time, the controller 206 interprets the depression as a request to toggle the on/off state of the vacuum cleaner 100, and the controller 206 toggles the on/off state of the vacuum cleaner 100. If the depression time is less than the threshold time, the controller 206 interprets the depression of the power switch 314 as an unintentional depression, and the controller 206 does not toggle the on/off state of the vacuum cleaner 100. In the example embodiment, the threshold is a predetermined threshold that is the same for turning the vacuum cleaner 100 on and off. In some embodiments, the predetermined threshold is two seconds. Other embodiments include a predetermined threshold that is shorter or longer than two seconds. Alternatively, the threshold time for turning the vacuum cleaner 100 on may be different than the threshold for turning the vacuum cleaner 100 off. Moreover, in some embodiments, the threshold time is not predetermined and may be varied based, for example, how long the user depressed the power switch 314 in previous instances, the condition of the vacuum cleaner (e.g., whether it is moving, its orientation relative to the ground, or other conditions suggestive of whether or not the user intends to continue or cease vacuuming, or the like), or based on any other suitable variable for distinguishing between intentional and unintentional presses of the power switch 314.

The speed at which the motor 224 operates is selectable by the user using the speed selection switch 316. The speed selection switch 316 in the example embodiment is a DPDT switch that connects and disconnects a speed select pin of the controller 206 to ground. The controller 206 detects whether or not the speed select pin is connected to ground. That is, a first pole of the speed selection switch 316 has one terminal connected to ground and the speed select pin, while the other terminal is only connected to the speed select pin of the controller 206 (i.e., the speed select pin is floating). Power is provided to the controller 206 through the first pole (the ground/return line is continuously connected to the controller 206). On the second pole, both terminals are connected to the power input of the controller 206. The grounded and not grounded (i.e., floating) states of the speed select pin from the first pole represent high and low (or low and high) speed selections. The DPDT switch is an on-off-on type DPDT switch, and the middle/off position functions as a power disconnect position that opens the power circuit by leaving the power input and the speed select pin of the controller 206 open (i.e., floating) to prevent a battery of the power source 208 (in battery powered embodiments) from being drained when the vacuum cleaner 100 is not being operated.

Other embodiments do not include the speed selection switch 316. Rather, the speed is selected by particular timed depressions of the power switch 314 or using a potentiometer and an analog to digital converter (ADC).

In embodiments using the timed depression of the power switch 314, for example, when the vacuum cleaner 100 is on (i.e. the motor 224 is running), a depression of the power switch 314 longer than a setting threshold, but shorter than the threshold to turn off the vacuum cleaner 100 is treated by the controller 206 as a request to cycle to a next speed setting of the motor 224. The cycling may be by increment (e.g., low to medium) or by decrement (e.g., medium to low). For example, if the threshold for turning the vacuum cleaner 100 is two seconds, the setting threshold may be one-half of a second. With the vacuum cleaner 100 on, depressing the power switch 314 for at least half a second (but less than two seconds) changes the speed of the motor to a next level above or below (depending on the particular embodiment).

In embodiments using a potentiometer and an ADC, the potentiometer provides a continuously variable (by the user adjusting the resistance of the potentiometer) analog signal to the ADC. This signal is converted by the ADC to a digital signal corresponding to the magnitude of the analog signal, and the digital signal is provided to the controller 206. The controller 206 then sets the speed of the motor 224 based on the value of the digital signal (and correspondingly based on the magnitude of the analog signal).

In some embodiments, the power switch 314 is also used to instruct the controller 206 to perform diagnostics on the vacuum cleaner 100. For example, when the vacuum cleaner 100 is off, depressing the power switch 314 for a length of time longer than a diagnostic threshold is understood by the controller 206 as a command to perform diagnostics and report results and/or recommended maintenance (such as via the display 318). Alternatively, the diagnostic results and recommendations may be stored in memory 306 for retrieval by the user or a service technician. The diagnostic threshold is greater than the threshold for turning on the vacuum cleaner 100. In such embodiments, the diagnostic threshold also functions as a maximum threshold for turning on the vacuum cleaner 100. That is, to turn on the vacuum cleaner, the power switch 314 must be depressed for longer than the threshold, but less than diagnostic threshold. In an example, the threshold is two seconds and the diagnostic threshold is ten seconds. Alternatively, any other suitable thresholds may be used.

The controller 206 is also configured to prevent operation of the vacuum cleaner 100 when the filter 220 is not installed in the vacuum cleaner 100. A sensor (e.g., sensor 228) is positioned to detect when the filter 220 is installed and to provide a signal to the controller 206 when the filter 220 is not installed. Alternatively, the sensor may provide a signal when the filter 220 is installed and not provide a signal when the filter is absent. In an example embodiment, the sensor is a switch connected in series to a sensing pin of the controller 206. When the filter 220 is installed, the filter 220 depresses the switch, closing the circuit connection to the sensing pin, and thereby provides a signal to the controller that the filter 220 is installed. When the filter 220 is absent (or improperly installed), the switch is not depressed, the circuit is open, and no signal is provided to the sensing pin of the controller 206. Alternatively, the switch may be positioned to detect whether a cover (or door) of debris chamber 214 (in which the filter 220 is located) is open or closed. The controller 206 is configured to prevent operation of the motor 22 when the cover is open and allow operation when the cover is closed. By preventing operation of the vacuum cleaner 100 when the filter 220 is not installed or the cover is open, debris may be prevented from contaminating the motor and/or striking the impeller 222 or other elements of the suction unit 204.

The controller 206 provides thermal protection for the motor 224 and drive circuit 320, and communicates thermal protection related information to the user of the vacuum cleaner 100. The controller 206 monitors the temperature of the switches 322 of the drive circuit 320 using the temperature sensor 324. Generally, when the detected temperature exceeds a first temperature threshold, the controller 206 reduces the power output of the motor 224 and warns the user of an excess temperature condition. If the temperature does not drop below the first temperature threshold in a threshold time, or if the temperature exceeds a second temperature threshold, the controller stops the motor 224 to avoid damage to the motor due to the excessive temperature.

Figure 4:
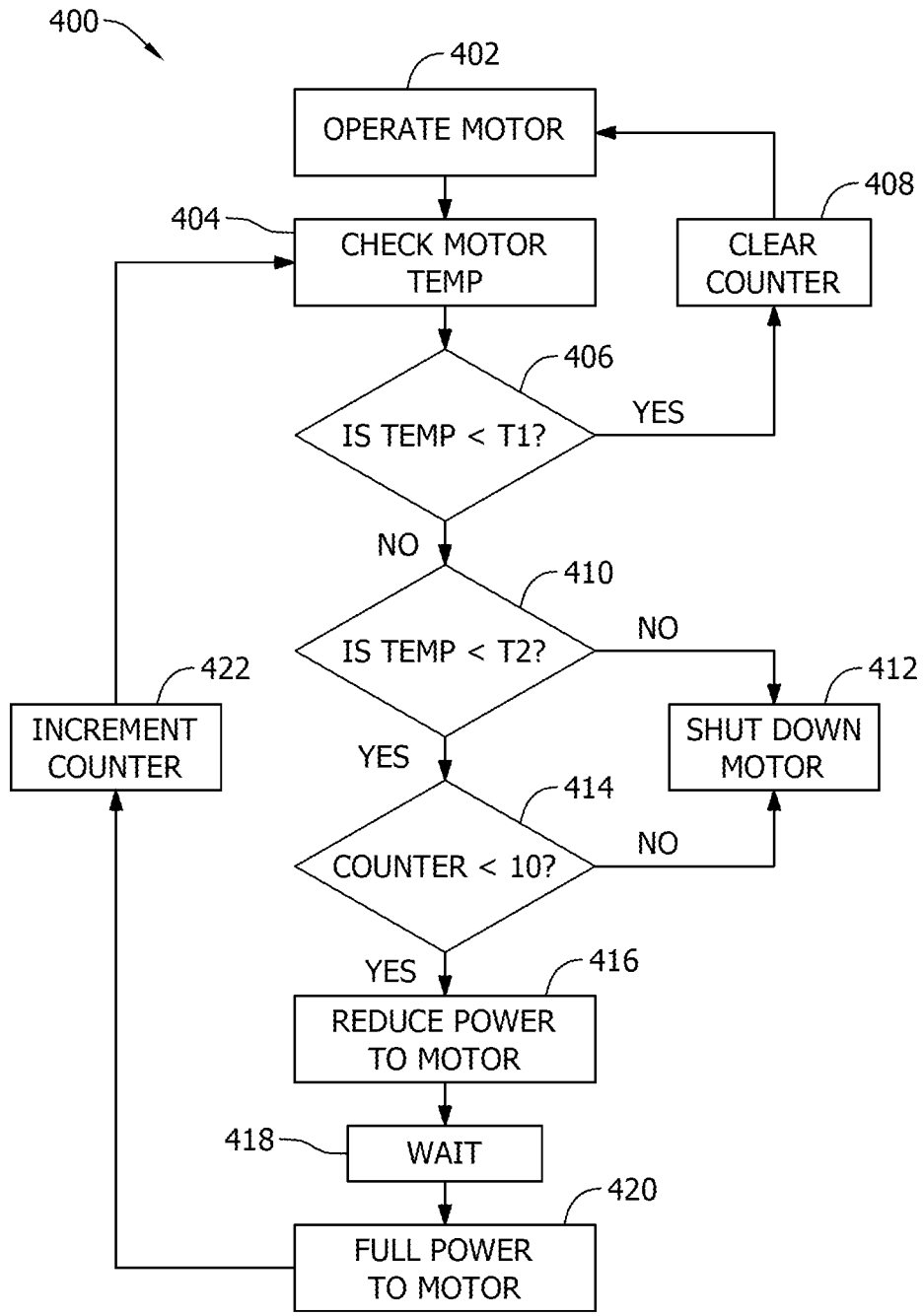
FIG. 4 is a flow diagram of an example method of thermal protection and annunciation for the vacuum cleaner shown in FIG. 1.

FIG. 4 is a flow diagram of an example method 400 of thermal protection for use with the vacuum cleaner 100. The method 400 may be used with other vacuum cleaners, and the vacuum cleaner may use other methods for providing thermal protection and communication. At 402, the controller 206 is operating the motor 224 under normal operation, during which a counter is set at zero. At 404, the controller checks the motor 224 temperature using the temperature sensor 324. At 406, the controller 206 compares the detected temperature to a first temperature threshold T1. The temperature T1 is a predetermined threshold greater than expected during normal operation, but lower than a temperature at which the motor 224 should be shut down immediately (second temperature threshold T2). In the example embodiment, the first temperature threshold T1 is 85° C. and the second temperature threshold T2 is 100° C. In other embodiments, T1 and T2 may be any other temperatures suitable for protecting the motor 224 and the drive circuit 320 from thermal damage, and may be selected based on the power ratings and temperature ratings of the components of the drive circuit 320 and the motor 224. If the temperature is less than T1, the counter is cleared and the controller 206 continues normal operation at 402. Other embodiments may include more than two temperature thresholds or temperature thresholds having different temperature values. Some embodiments may include different warnings (e.g., different sounds, different lights, and the like) for the different temperature ranges represented by the more than two temperature thresholds.

If the temperature is greater than or equal to T1, a temperature protection and annunciation begins. The controller 206 compares the temperature to the second temperature threshold T2 at 410. If the temperature is greater than or equal to T2, the controller 206 shuts down the motor 224 at 412. If the temperature is less than T2, at 414, the controller 206 determines if the counter is less than 10. If the counter equals or exceeds 10, the controller 206 shuts down the motor 224 at 412.

If the counter is less than 10, the controller 206 reduces the power output for the motor 224 at 416. In the example embodiment, the power is reduced by 75% (i.e., it is operated at 25% of full power). In other embodiments, the power output may be reduced by a larger or smaller percentage. At 418, the controller 206 waits for a period of time while the motor 224 is operated at the reduced power. The period of time is a predetermined, fixed period of time in the example embodiment and is 1.5 seconds. In other embodiments, the period of time may be a shorter or longer fixed, predetermined period of time. In still other embodiments, the period of time may be a variable period of time, such as a period of time that increases as the amount by which the detected temperature exceeds the first temperature threshold T1 increases. At 420, after waiting for the period of time, the controller 206 resumes full power operation of the motor 224. Alternatively, the controller 206 may increase the motor 224 power above the reduced power, but below full power. At 422, the counter is incremented by one and the method returns to 404 to check the temperature and again compare the temperature to the first temperature threshold T1. Although only one counter loop is shown and described, more than one counter loop (e.g., sub-routine loops) may be included.

Steps 416, 418, and 420 both facilitate reducing the temperature of the motor 224 and announce to the user that motor 224 temperature is high and temperature protection is engaged. By running the motor 224 at a reduced power level for the waiting period of step 418, less power is dissipated and the temperature may decrease. During this time period, the motor is derated to run at a power level lower than its normal rated power level. Reducing the power at 416, waiting at 418, and then returning to full power at 420 produces a tactile and audible alert to the user. That is, the vibration of the vacuum cleaner 100 and the pitch of the running motor 224 will change in a pulse pattern from the vibration and sound during normal operation at 402. Thus, the user is alerted to the condition and may take action (such as turning off the vacuum cleaner 100, clearing an airway obstruction, cleaning or replacing the filter, or the like.

Moreover, the pulsing of the motor 224 will also pulse the vacuum suction strength, which may help clear soft obstructions that are restricting airflow and contributing to the increased temperature of the motor. The pulsing of the suction strength can create a hammering force on soft obstructions to overcome static force and push the obstructions past airflow restriction points.

Other embodiments may include more than one temperature threshold each associated with a different power reduction or a different wait time. In such embodiments, as the threshold increases, the power reduction and/or the wait time increases. Moreover, in some embodiments, a separate temperature threshold (a "reset threshold") lower than the first temperature threshold T1 is used at 406 when the counter is equal to or greater than one. Thus, such embodiments include hysteresis such that once the temperature exceeds T1, the temperature must drop to a reset temperature below T1 before the thermal protection and annunciation loop can be exited. This will avoid the vacuum cleaner pulsing (416-420) one or a few times to drop the temperature below T1 and then operating for a brief time before the temperature again rises above T1. For example, in an embodiment where T1 is 85° C., the reset threshold may be 75° C.

In some embodiments, warnings to the user about an overtemperature event may additionally or alternatively be provided to the user through the user interface 302 of the vacuum cleaner 100. For example, an overtemperature warning may be presented to the user via the user interface 302 when the controller 206 detects the temperature exceeds T1 at 406. The warning may be presented using the display 318. When the display 318 is an LED or an array of LEDs, the warning may be present by a particular pattern of blinking, lighting a particular LED associated with a temperature warning, lighting a particular color LED, or lighting a particular pattern of LEDs. If the display 318 is an LCD panel, an LED panel, or other similar display panel, the warning may be displayed as a text warning readable by the user. In other embodiments, the user interface 302 includes an audio output device (not shown), such as a piezoelectric device, to produce human audible sounds to convey information about an alert condition (e.g., a high temperature, a low battery voltage, a motor fault, an upcoming maintenance requirement, or the like) to the user. In such embodiments, the audio output device may output a unique pattern of sound or a unique tone to indicate that thermal protection has been started (e.g., when the temperature exceeds or equals T1). Alternatively, the audio output device may output a spoken warning to the user (using a recorded announcement or a text-to-speech announcement). Additionally, or alternatively, the user interface 302 may include a vibration motor (not shown) to provide information to a user. Similar to the audio output of the audio output device, the vibration motor may output a unique pattern of vibration to indicate that thermal protection has been started (e.g., when the temperature exceeds or equals T1).

The controller 206 provides low battery voltage information to the user of the vacuum cleaner 100. Generally, the controller 206 monitors the voltage of the battery 118 and warns the user when the battery voltage is lower than a predefined, fixed threshold voltage to warn the user that the battery is almost discharged. Thus, the user is warned of the impending stoppage of the vacuum cleaner 100 operation and has time to replace the battery with a charged battery, plug in the vacuum cleaner to operate off AC power (in embodiments with AC power operation) and charge the battery, or attempt to finish vacuuming before the battery is exhausted.

Figure 5:
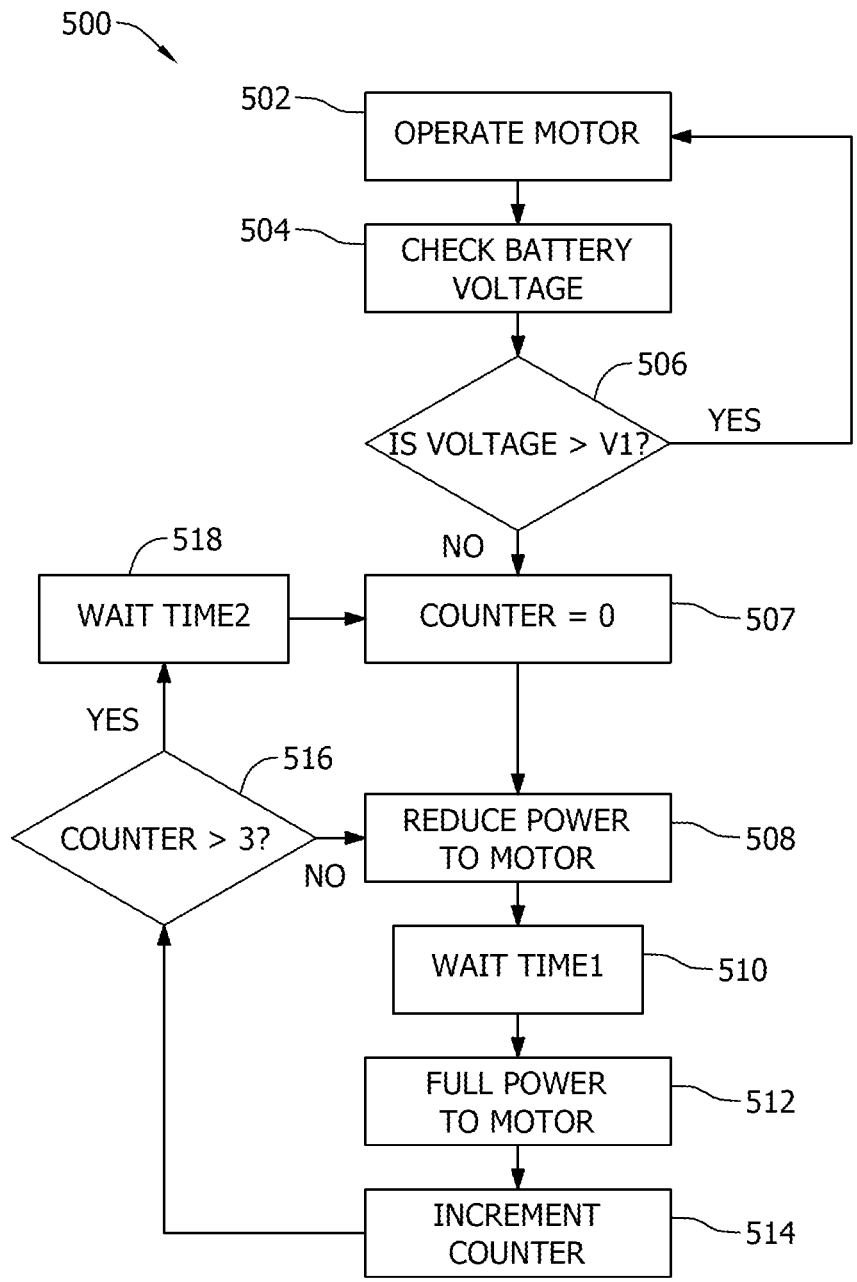
FIG. 5 is a flow diagram of an example method of low voltage annunciation for the vacuum cleaner shown in FIG. 1.

FIG. 5 is a flow diagram of an example method 500 of informing the user of a low battery voltage. The method 500 may be used with other vacuum cleaners, and the vacuum cleaner 100 may use other methods for communicating a low battery voltage to the user.

At 502, the controller 206 is operating the motor 224 under normal operation, during which a counter is set at zero. At 504, the controller checks the voltage of the battery 118. At 506, the controller 206 compares the detected voltage to a low voltage threshold V1. The low voltage threshold V1 is selected to provide the low voltage warning approximately five minutes before the battery will be discharged to the point that the vacuum cleaner 100 can no longer operate. Thus, the value of the low voltage threshold V1 depends on the particular battery 118 used in the vacuum cleaner 100. For a 36 volt, 6 amp hour (Ah) battery, V1 is approximately 32.15 volts, while V1 is approximately 30.73 volts for a 36 volt 12 aH battery. The low voltage threshold V1 may also differ depending on the speed setting at which the vacuum cleaner is being operated. In other embodiments, V1 may be selected to correspond to a different amount (more or less than five minutes) of remaining operational time before the battery 118 is discharged. In still other embodiments, the low voltage threshold V1 is selected to correspond to a remaining capacity or voltage of the battery 118 relative to its initial capacity or voltage, such as ten percent of initial capacity, twenty-five percent of initial capacity, eighty-five percent of initial voltage, ninety percent of initial voltage, etc.

In other embodiments, the user may select the low voltage threshold V1 to adjust the length of time between a warning and a depleted battery 118, or may disable the low voltage warning completely. Thus, the step 506 may include selecting the low voltage threshold V1 corresponding to the particular battery 118 installed in the vacuum cleaner 100 and the current speed setting of the vacuum cleaner 100. In other embodiments, the low voltage threshold V1 is not predetermined. Rather, the controller 206 monitors the battery voltage decay rate during operation and calculates low voltage threshold V1 to provide a warning a certain length of time (e.g., five minutes) before the battery is drained based on the monitored decay rate.

If the detected voltage is greater than the low voltage threshold V1, the method returns to 502 and the controller 206 continues normal operation of the motor 224. If the detected voltage is less than or equal to V1, the controller 206 sets a counter equal to zero at 507. At 508, the controller 206 reduces the power output for the motor 224. In the example embodiment, the power is reduced by 75% (i.e., it is operated at 25% of full power). In other embodiments, the power output may be reduced by a larger or smaller percentage. At 510, the controller 206 waits for a first period of time (TIME1) while the motor 224 is operated at the reduced power. The first period of time is a predetermined, fixed period of time in the example embodiment and is 1.5 seconds. In other embodiments, the first period of time may be a shorter or longer fixed, predetermined period of time. In still other embodiments, the first period of time may be a variable period of time, such as a period of time that increases as the amount by which the detected voltage is below V1 increases. At 512, after waiting for the first period of time, the controller 206 resumes full power operation of the motor 224. Alternatively, the controller 206 may increase the motor 224 power above the reduced power, but below full power. As explained above with respect to FIG. 4, this reduction of power followed by a return to full power produces a tactile and audible warning perceptible by the user as a vibrational and audible pulsing.

At 514, the counter is incremented by one. The controller 206 determines at 516 if the counter is greater than three. If the counter is not greater than three, the controller 206 returns to 508. Thus, the controller will perform the reduction of power and resumption of full power four times before step 516 will return a yes answer. When the counter is greater than three, the controller waits for a second period of time (TIME2) at 518 before returning to 507 and resetting the counter to 0. The second period of time is longer than the first period of time. In the example, the second period of time is sixty seconds. In other embodiments, the second period of time may be longer or shorter, so long as it is noticeably (by the user) longer than the first period of time. The second period of time introduces a break in the pulsing caused by steps 508-512. As a result, the pulsing pattern in the method 500 will differ from the continuous pulsing in the method of 400. Thus, the user may distinguish a warning about a low battery voltage from a warning about an overtemperature condition. Although only one counter loop is shown and described, more than one counter loop (e.g., sub-routine loops) may be included. Other embodiments may include more than two time periods.

Warnings to the user about a low battery voltage may additionally or alternatively be provided to the user through the user interface 302 of the vacuum cleaner 100. For example, a low battery voltage may be presented to the user via the user interface 302 when the controller 206 detects the voltage is less than or equal to V1 at 506. The warning may be presented using the display 318. When the display 318 is an LED or an array of LEDs, the warning may be present by a particular pattern of blinking, lighting a particular LED associated with a low battery voltage, lighting a particular color LED, or lighting a particular pattern of LEDs. If the display 318 is an LCD panel, an LED panel, or other similar display panel, the warning may be displayed as a text warning readable by the user. In other embodiments, the user interface 302 includes an audio output device (not shown), such as a piezoelectric device, to produce human audible sounds to convey information to the user. In such embodiments, the audio output device may output a unique pattern of sound or a unique tone to indicate that a low battery voltage has been detected (e.g., when the voltage is less than or equal to V1). Alternatively, the audio output device may output a spoken warning to the user (using a recorded announcement or a text-to-speech announcement). Additionally, or alternatively, the user interface 302 may include a vibration motor (not shown) to provide information to a user. Similar to the audio output of the audio output device, the vibration motor may output a unique pattern of vibration to indicate that a low battery voltage has been detected (e.g., when the voltage is less than or equal to V1).

The user interface 302 may also be used by the controller 206 to provide other information to the user of the vacuum cleaner 100. For example, when the user depresses the power switch 314, there will typically be a delay before the motor 224 begins rotation sufficient to be felt or heard by the user. Thus, in some embodiments, the display 318 displays an operating notification indicating that the vacuum cleaner 100 is operating (and more specifically, that the motor 224 is on). For example, if the display 318 is an LED, the LED may blink with a particular pattern. Alternatively, the operating notification may include lighting a particular LED associated with a low battery voltage, lighting a particular color LED, or lighting a particular pattern of LEDs. If the display 318 is an LCD panel, an LED panel, or other similar display panel, the operating notification may be displayed as a text warning readable by the user. In embodiments in which the user interface 302 includes an audio output device, such as a piezoelectric device, the audio output device may be used to output a unique pattern of sound or a unique tone as the operating notification. Alternatively, the audio output device may output a spoken operating notification to the user (using a recorded announcement or a text-to-speech announcement). In embodiments including a vibration motor, the vibration motor may output a unique pattern of vibration as the operating notification. Similar techniques may be used with whichever display, audio, vibrational or other elements are included in the user interface to inform the user of a motor fault (such as a locked rotor), of an upcoming maintenance requirement, of a status of the filter 220, of a cumulative number of hours that the vacuum cleaner has been operated, of a clogged filter or hose (e.g., as measured by a pressure differential filter), or of any other suitable information related to the vacuum cleaner 100 and its operation.

As discussed above with respect to FIG. 3, the reverse polarity protection circuit 326 protects the controller 206 and other components of the vacuum cleaner from damage caused by the power source 208 being incorrectly connected to the controller 206 with the incorrect polarity. The reverse polarity protection circuit 326 will be discussed with reference to FIG. 6, which is a simplified diagram of the reverse polarity protection circuit 326, the power source 208, and the controller 206.

The power source 208 includes a positive terminal 600 and a negative terminal 602. The controller 206 includes a positive terminal 604 and a negative terminal 606 (also referred to as a "return terminal"). The reverse polarity protection circuit 326 is connected between the power source 208 and the controller 206 to protect against the controller's positive terminal 604 being connected to the power source's negative terminal 602 and the controller's negative terminal 606 being connected to the power source's positive terminal 600. The reverse polarity protection circuit 326 includes an N-type MOSFET 608 connected in the return path of the controller 206. Specifically, source (S) of the MOSFET 608 is connected to the negative terminal 606 of the controller 206, the gate (G) of the MOSFET 608 is connected to the expected positive terminal (e.g., the trace, wire, or connector that is intended to connect to the positive terminal 600) of the power source 208, and the drain (D) of the MOSFET 608 is connected to the expected negative terminal (e.g., the trace, wire, or connector that is intended to connect to the negative terminal 602) of the power source 208. Although not shown for clarity of illustration, the gate G is connected to the expected positive terminal through a clamped and protected connection, and is referenced to the source S through a resistive connection. The clamped and protected connection can be provided using any suitable electrical components, including, for example and without limitation, Zener diodes, rectifier diodes, switching diodes, TVS diodes, transorbs, varistors, and voltage dividers (varistors, resistors) configured in combinations of series/parallel arrangements, and unipolar or bipolar components.

Figure 6:
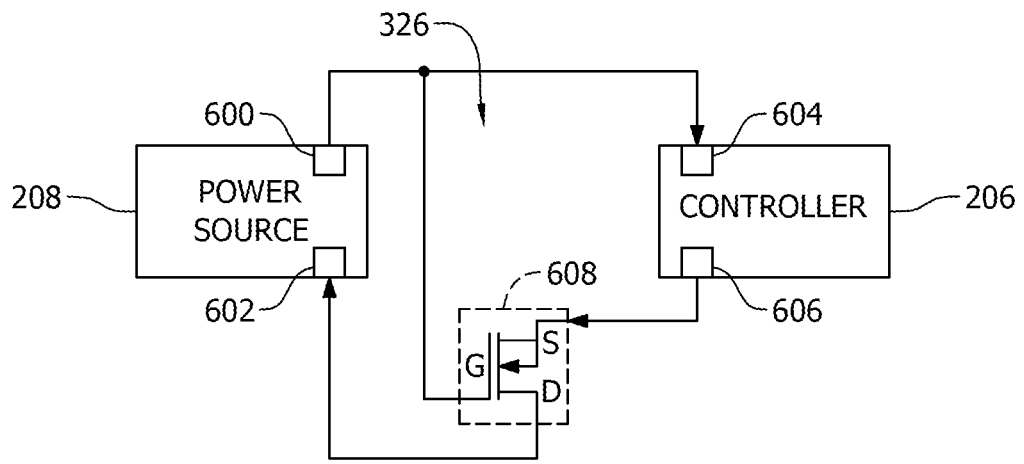
FIG. 6 is a simplified diagram of the power source, the controller, and the reverse polarity protection circuit of the vacuum cleaner shown in FIG. 1 with the correct polarity connection.

When the controller 206 is connected to the power source 208 with the correct polarity (as illustrated in FIG. 6), the MOSFET 608 is placed into saturation mode, which electrically acts as a short circuit. Thus, under correct polarity, the MOSFET 608 connects the negative terminal 606 of the controller 206 to the negative terminal 602 of the power source 208 by a low resistance (e.g., a few milliohms) path through the MOSFET's intrinsic junction. This short-circuit (very low resistance) path allows normal current flow and hence normal circuitry operation.

Figure 7:
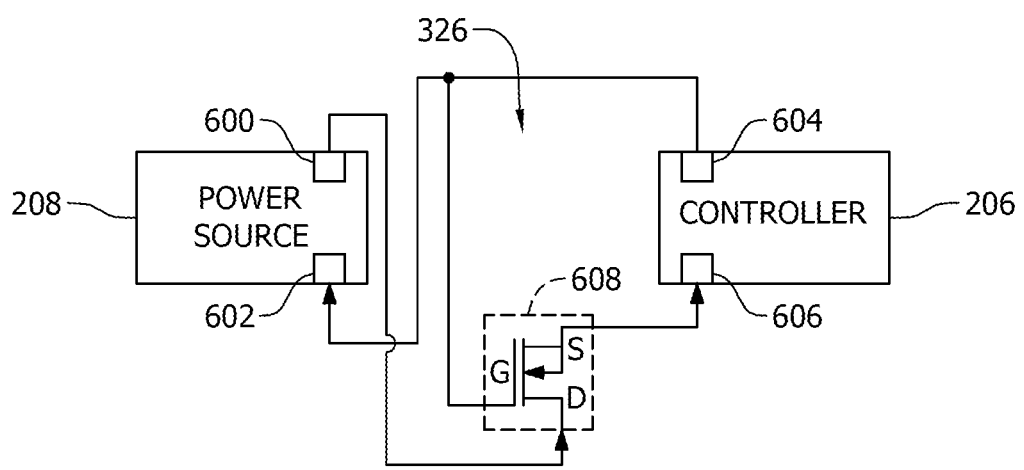
FIG. 7 is a simplified diagram of the power source, the controller, and the reverse polarity protection circuit of the vacuum cleaner shown in FIG. 1 with the incorrect polarity connection.

When the controller 206 is connected to the power source 208 with the incorrect polarity, the gate G is connected to the negative terminal 602 and the drain D is connected to the positive terminal 600, as shown in FIG. 7. With this incorrect connection, the MOSFET 608 is placed into cutoff mode, which electrically acts as an open circuit. Thus, the MOSFET 608 connects the negative terminal 606 of the controller 206 to the positive terminal 600 of the power source 208 by a very high resistance (e.g., mega-ohms) path through the MOSFET's intrinsic junction. This open-circuit (very high resistance) prevents damaging reverse polarity current from flowing and prevents the controller 206 from operating.

Figure 8:
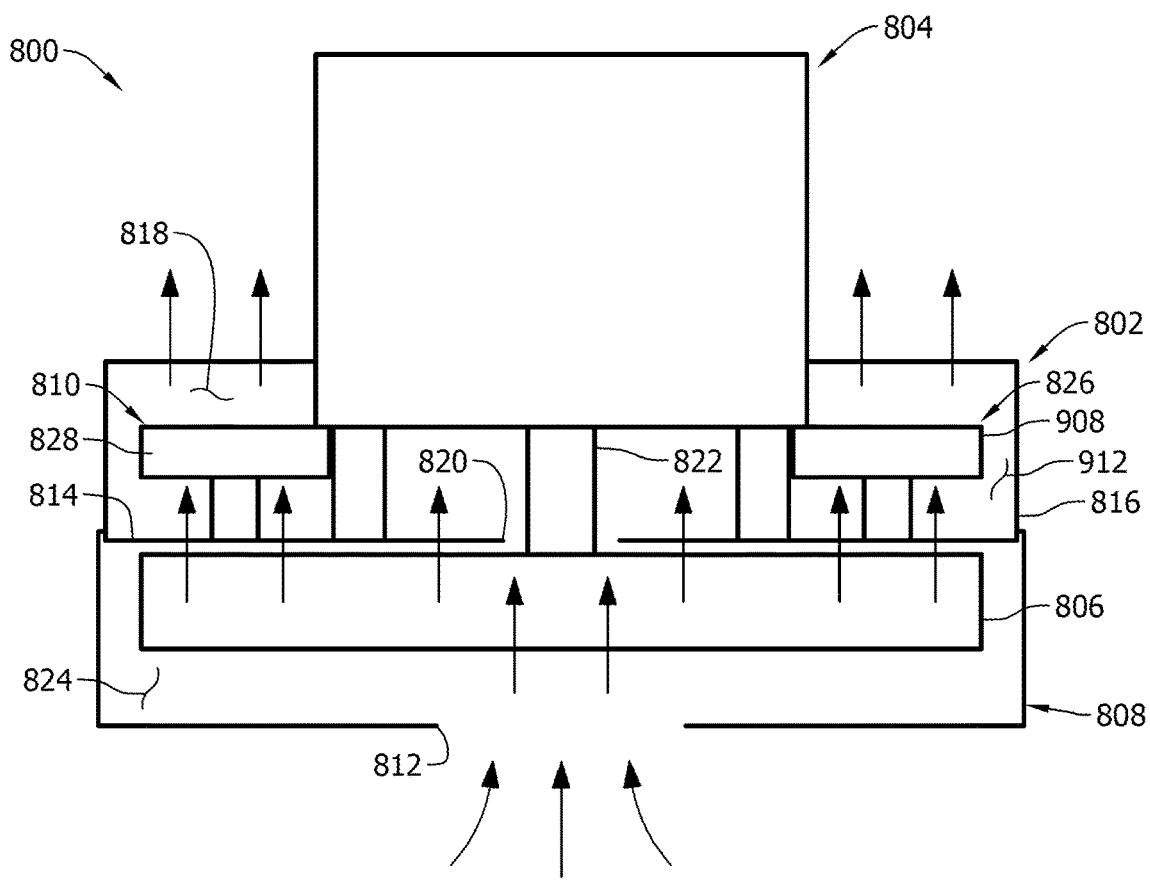
FIG. 8 is a schematic sectional view of an example motor assembly suitable for use in the vacuum cleaner shown in FIGS. 1-3.
Figure 9:
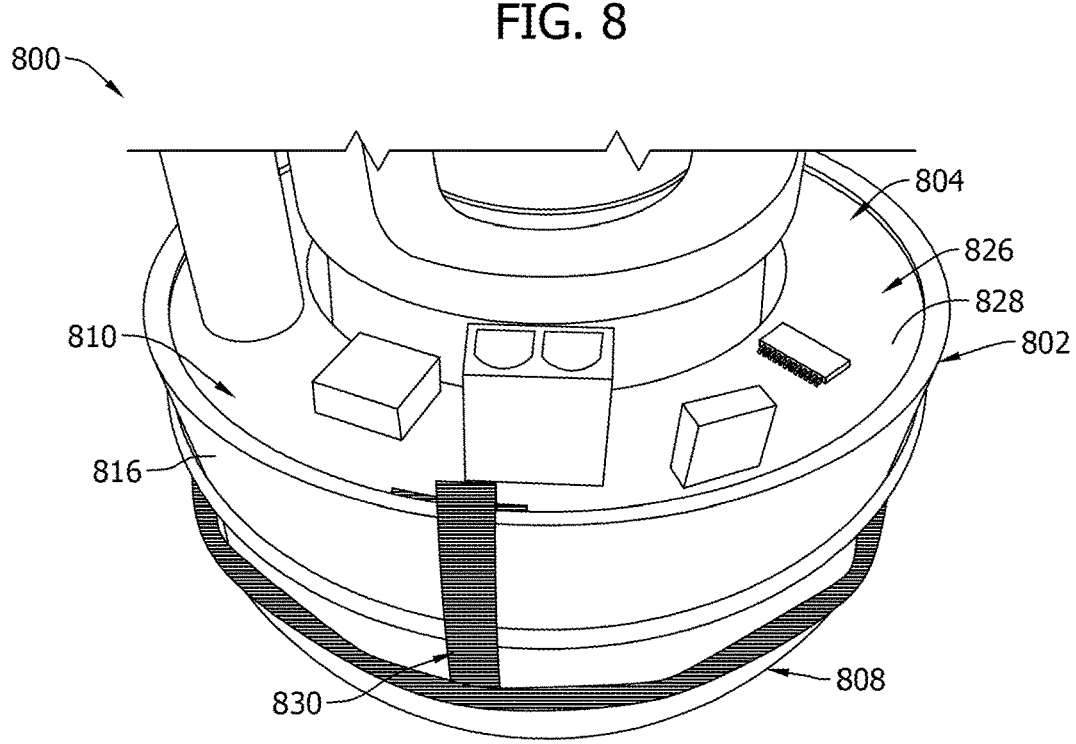
FIG. 9 is a perspective view of the motor assembly shown in FIG. 8.

An example motor assembly 800 suitable for use in the vacuum cleaner of FIGS. 1-3 is illustrated in FIGS. 8 and 9. The motor assembly 800 includes a motor casing or housing 802, a motor 804 (e.g., motor 224, shown in FIGS. 2 and 3) coupled to and at least partially enclosed within the motor housing 802, a fan or impeller 806 (e.g., impeller 222, shown in FIGS. 2 and 3), an impeller housing 808, and a controller 810 (e.g., controller 206 shown in FIGS. 2 and 3).

In the illustrated embodiment, the motor assembly 800 is a flow-through motor assembly. That is, the motor assembly is shaped such that air flows through the motor assembly 800 from an impeller inlet 812, through the impeller housing 808 and the motor housing 802 and across the motor 804. In other embodiments, the motor assembly 800 may be configured other than as a flow-through motor assembly, such as a bypass motor assembly.

Figure 16:
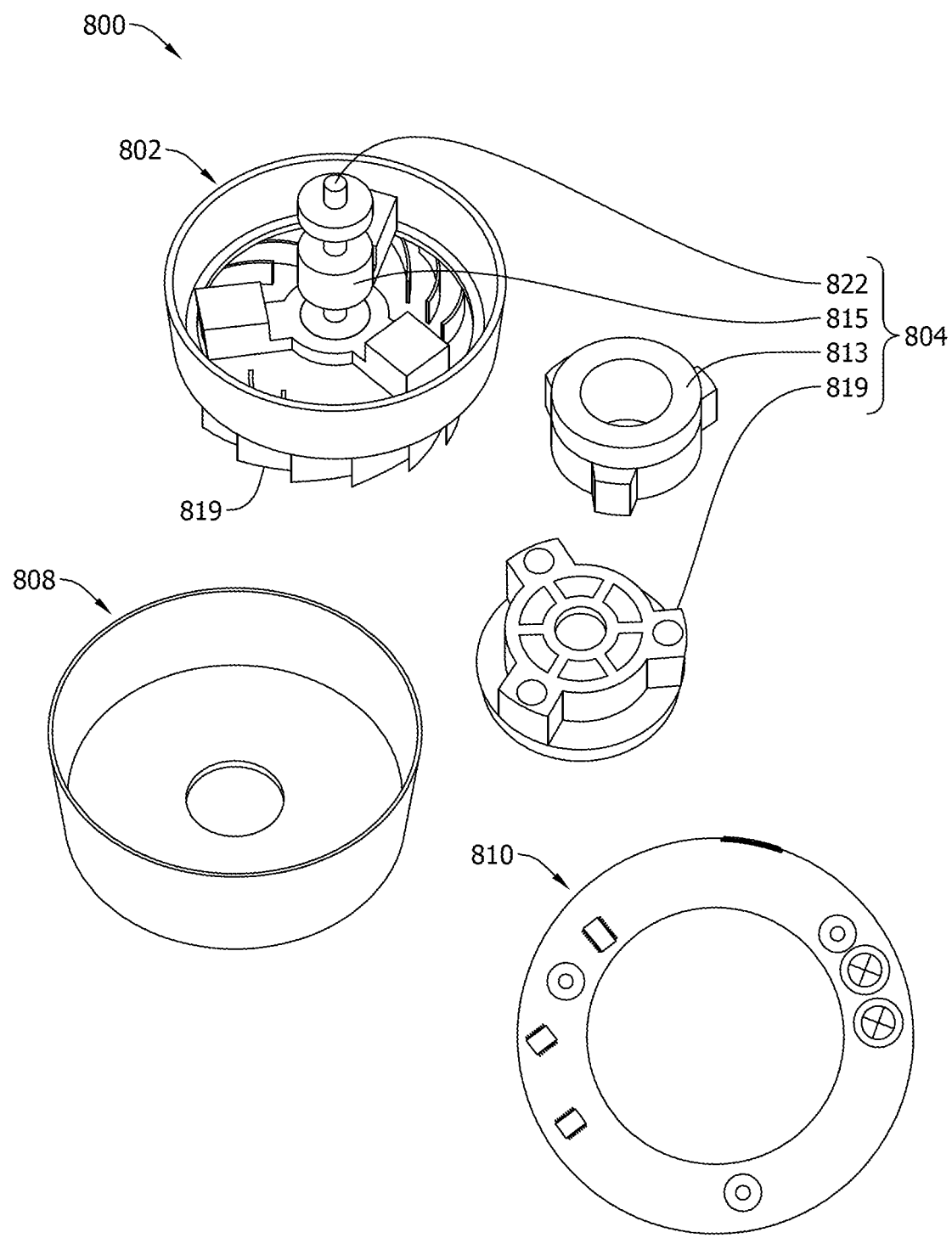
FIG. 16 is a perspective view of the motor assembly shown in FIG. 9, illustrated in a disassembled state.
Figure 17:
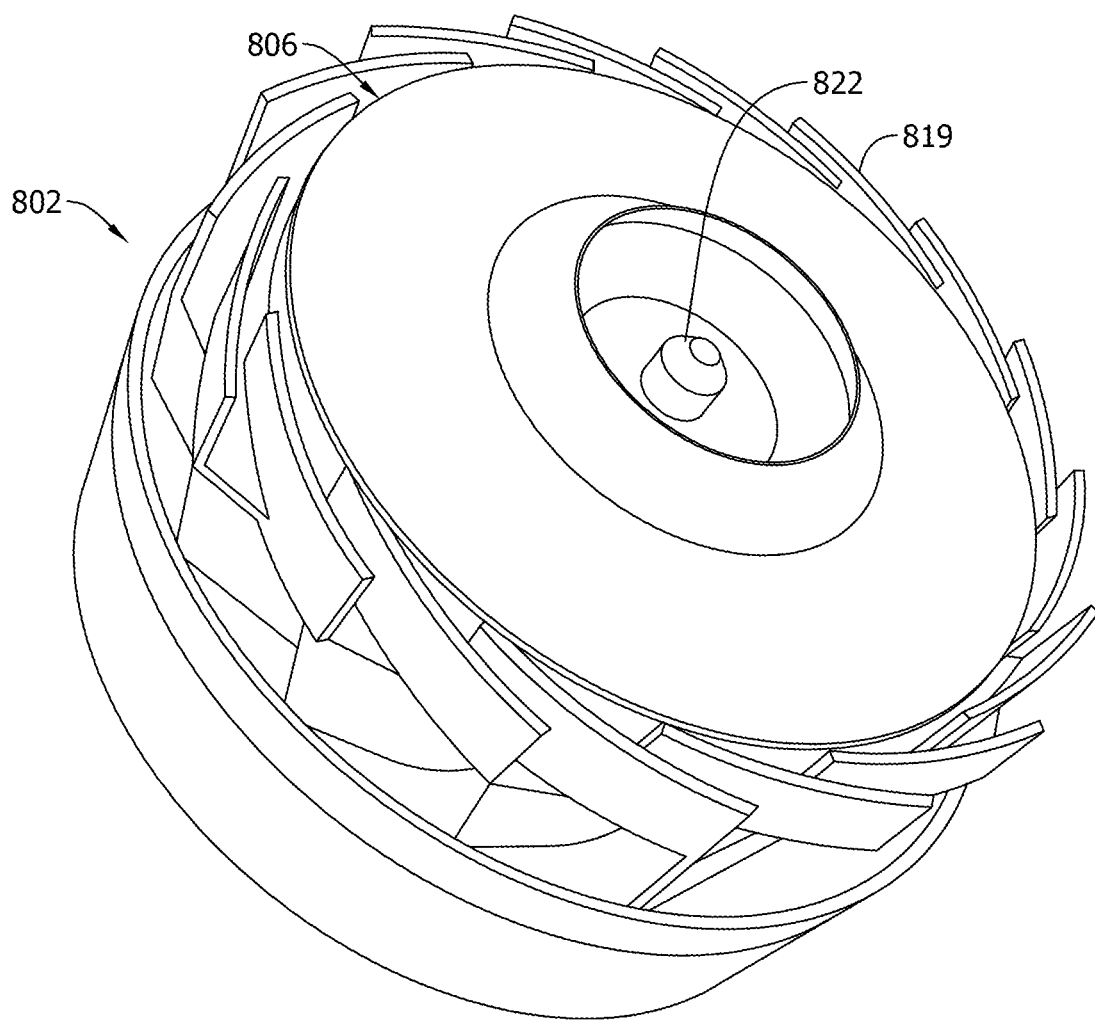
FIG. 17 is a bottom perspective view of the motor housing of the motor assembly shown in FIG. 9.

FIG. 16 illustrates the motor assembly 800 in a disassembled state, and illustrates additional components of the motor assembly 800, such as a motor stator 813, a motor rotor 815, a motor end cap 817, a motor shaft 822, and an air vane 819 of the motor housing 802. FIG. 17 is a bottom perspective view of the motor housing 802 with the impeller 806 attached to the motor shaft 822. The motor assembly 800 is sized, shaped and configured to be installed in a vacuum cleaner (e.g., vacuum cleaner 100) as a single assembly or unit. That is, once the motor assembly 800 is assembled, it is connected to the vacuum cleaner as a unit such that the motor assembly 800 generates air flow through the debris chamber (e.g., debris chamber 214) of the vacuum cleaner.

The motor housing 802 provides structural support to components of the motor assembly 800. For example, the impeller housing 808, motor 804, and controller 810 are connected to the motor housing 802. The motor housing 802 also encloses certain components of the motor assembly 800, such as the controller 810. More specifically, the motor housing 802 of the illustrated embodiment is cup-shaped and includes a circular base wall 814 and a radial outer annular sidewall 816 extending upward from the base wall and entirely around the motor housing 802. The base wall 814 and annular sidewall 816 cooperatively define a cavity 818 in which the controller 810 is positioned. The motor housing 802 may also include a radial inner sidewall or boss that supports the motor 804 within the motor housing 802. The base wall 814 includes an opening or aperture 820 through which the shaft 822 of the motor 804 extends and connects to the impeller 806.

In the example embodiment, the motor housing 802 is constructed of an electrically-insulating material including, for example and without limitation, plastic, such as molded phenolic plastic. In other embodiments, the motor housing 802 may be constructed of other suitable materials, including, for example and without limitation, metalized or metal-plated plastic.

The impeller housing 808 is connected to the motor housing 802 (e.g., to the base wall 814), and defines an impeller cavity or chamber 824 in which the impeller 806 is located. In the example embodiment, the impeller housing 808 is constructed of an electrically-conductive material such as metal, including, for example and without limitation, steel, aluminum, aluminum alloys, and combinations thereof. In other embodiments, the impeller housing 808 may be constructed of other suitable materials, such as plastic.

The controller 810 is connected to the motor housing 802 and positioned within the cavity 818 defined by the motor housing 802. The controller 810 is electrically connected to the motor 804 to control operation thereof. In the illustrated embodiment, the controller 810 includes a circuit board assembly 826 that includes suitable circuit components (e.g., processors, such as processor 304, memory devices, such as memory device 306, microcontrollers, transistors, switches, capacitors, resistors) that enable the controller 810 to control operation of the motor 804. The circuit board assembly 826 also includes a ground or common circuit that provides a common electrical return for components electrically connected to the circuit board assembly 826.

Figure 10:
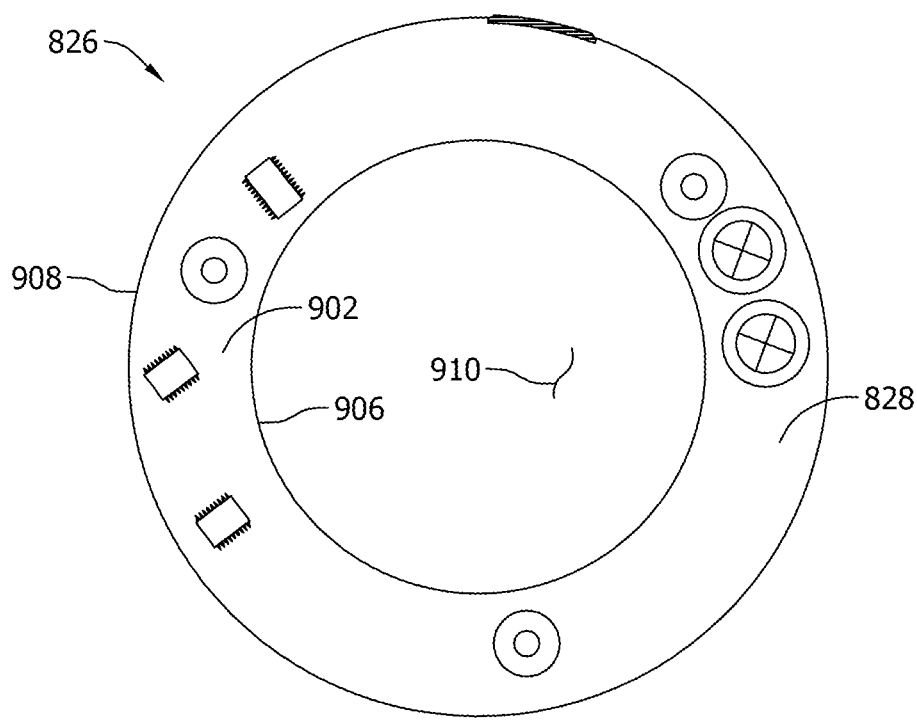
FIG. 10 is a top view of a circuit board assembly of the motor assembly shown in FIGS. 8 and 9.
Figure 11:
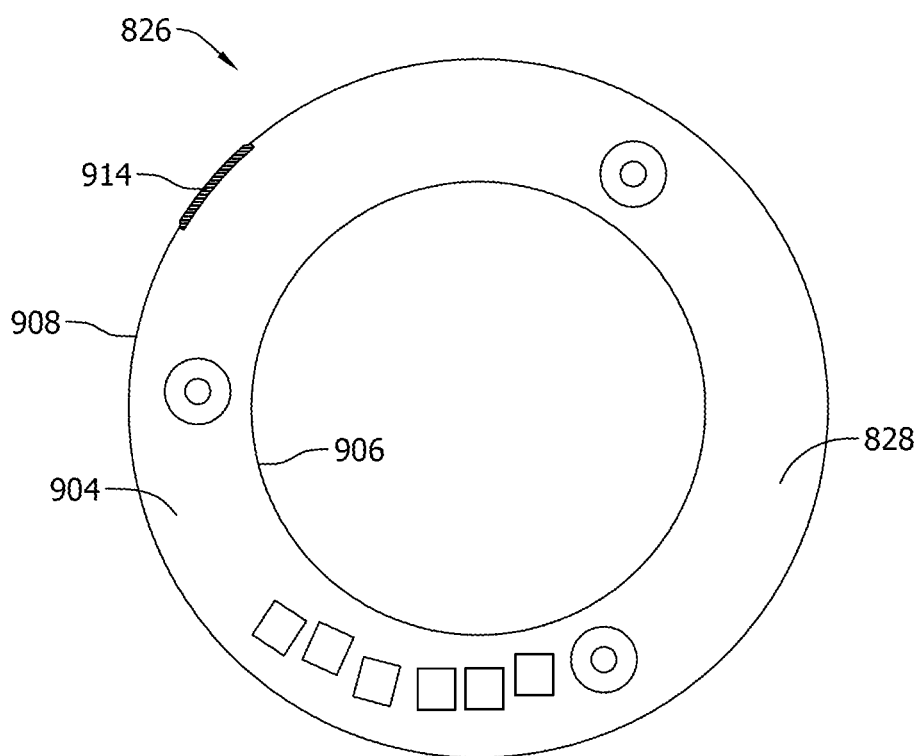
FIG. 11 is a bottom view of the circuit board assembly shown in FIG. 10.
Figure 12:
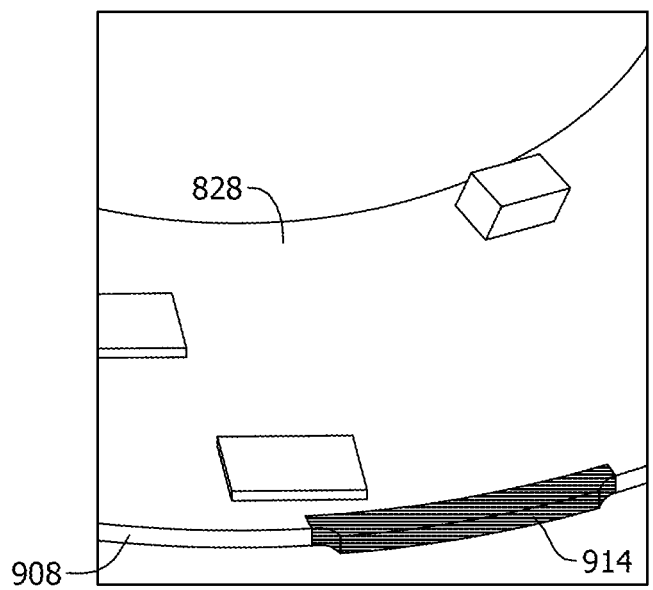
FIG. 12 is an enlarged view of a portion of the circuit board assembly shown in FIG. 10, illustrating conductive edge plating of the circuit board assembly.

The circuit board assembly 826 of the illustrated embodiment includes a ring-shaped printed circuit board 828 that is sized and shaped complementary to the cavity 818 defined by the motor housing 802. With additional reference to FIGS. 10 and 11, the printed circuit board 828 includes a first surface 902, a second surface 904 positioned opposite the first surface 902, an inner radial edge 906 extending between the first and second surfaces 902, 904, and an outer peripheral edge 908 extending between the first and second surfaces 902, 904. At least one of the first surface 902 and the second surface 904 includes conductive traces and/or conductive pads for mounting or otherwise electrically connecting circuit components to the printed circuit board 828. The inner radial edge 906 defines a central opening 910 sized and shaped to receive the motor 804 therein. As shown, for example in FIG. 8, when the printed circuit board 828 is installed in the motor housing 802, a gap 912 is defined between the outer peripheral edge 908 and the motor housing sidewall 816.

The illustrated printed circuit board 828 also includes conductive edge plating 914 disposed on at least a portion of the outer peripheral edge 908. The conductive edge plating 914 is electrically connected to the ground circuit of the circuit board assembly 826, and provides an electrical ground for other components of the motor assembly 800 as described herein. In the illustrated embodiment, the printed circuit board 828 includes a single segment of conductive edge plating 914 that extends circumferentially around a portion of the peripheral edge 908. The illustrated conductive edge plating 914 extends around the peripheral edge 908 by an angle of approximately 15°, although the conductive edge plating 914 may extend circumferentially around the peripheral edge 908 by an angle of greater than 15° or less than 15° in other embodiments. By way of example, the conductive edge plating 914 may extend around the peripheral edge 908 by an angle of between 0° and 360°, between 0° and 180°, between 180° and 360°, between 0° and 90°, between 45° and 135°, between 90° and 180°, between 135° and 215°, between 180° and 270°, between 225° and 315°, between 270° and 360°, between 0° and 45°, between 25° and 70°, between 50° and 95°, between 75° and 120°, between 0° and 20°, between 10° and 30°, between 20° and 40°, between 30° and 50°, between 40° and 60°, between 50° and 70°, between 5° and 20°, between 15° and 30°, between 25° and 40°, between 35° and 50°, between 45° and 60°, and between 55° and 70°. Moreover, the printed circuit board 828 may include more than a single segment of conductive edge plating 914 in other embodiments. By way of example, in some embodiments, the printed circuit board 828 includes a plurality of segments of conductive edge plating 914 spaced circumferentially around the peripheral edge 908. In yet other embodiments, the peripheral edge 908 of the printed circuit board 828 may include a single continuous segment of conductive edge plating that extends around the entire perimeter of the printed circuit board 828.

The electrically-conductive impeller housing 808 is electrically connected to the ground circuit of the circuit board assembly 826 by a suitable electrical connection between the impeller housing 808 and the circuit board edge plating 914. Connecting the electrically-conductive impeller housing 808 to the ground circuit of the circuit board assembly 826 facilitates reducing electromagnetic interference between the motor assembly 800 and external electrical components. More specifically, the impeller housing 808 is secured to the motor assembly 800 through the electrically-insulating motor housing 802, resulting in the impeller housing 808 being electrically-insulated or "electrically floating". Connecting the impeller housing 808 to the ground circuit of the circuit board assembly 826 prevents or reduces interaction of the impeller housing 808 with electromagnetic waves (e.g., generated by the motor assembly 800 and/or external sources), which might otherwise resonate through the impeller housing 808 and add to the electromagnetic noise signature of the motor assembly 800.

Figure 13:
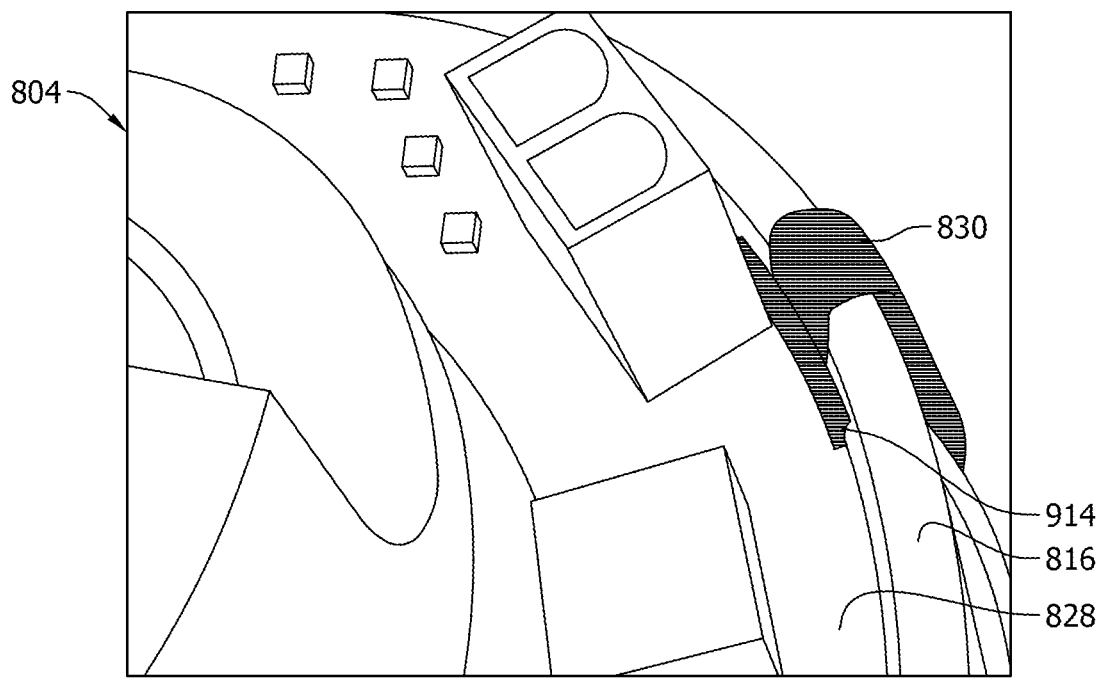
FIG. 13 is an enlarged view of a portion of the motor assembly shown in FIG. 9.

In the illustrated embodiment, the impeller housing 808 is electrically connected to the edge plating 914 by a flexible, compressible electrically-conductive conduit 830 (shown in FIGS. 9 and 13) that extends from the edge plating 914, over the sidewall 816 of the motor housing 802, and into contact with the impeller housing 808. More specifically, the electrically-conductive conduit 830 is positioned in the gap 912 defined between the printed circuit board 828 and the motor housing sidewall 816 such that, when the circuit board assembly 826 is positioned in the motor housing cavity 818, the electrically-conductive conduit 830 is compressed between the edge plating 914 and the motor housing sidewall 816.

The flexible, compressible electrically-conductive conduit 830 is compressible and has a relatively low hardness value (e.g., as compared to the motor housing 802, the printed circuit board 828, and the impeller housing 808). As a result, the electrically-conductive conduit 830 not only provides an electrical connection between the ground circuit and the impeller housing 808, but also provides mechanical dampening between the motor housing 802 and the printed circuit board 828.

Suitable materials from which the flexible, compressible electrically-conductive conduit 830 may be constructed include, for example and without limitation, electrically-conductive foams, electrically-conductive rubbers, knitted or wound wire mesh gaskets, and adhesives (e.g., acrylic). In the illustrated embodiment, the electrically-conductive conduit 830 is an electrically-conductive foam.

Electrically-conductive foams and rubbers can include, for example and without limitation, a foam or rubber core and an electrically-conductive cladding wrapped or wound around the core. Suitable materials from which the core may be constructed include, for example and without limitation, polyurethane foam, ethylene propylene diene monomer (EDPM) foam, silicone foam or sponge rubber, neoprene foam, and combinations thereof. Suitable materials from which the cladding may be constructed include, for example and without limitation, electrically-conductive fabrics (e.g., polyester embedded with copper and/or nickel), electrically-conductive foils (e.g., aluminum foil), metal-plated fabrics (e.g., fabric plated with copper, silver, and/or nickel), metal-wire mesh gaskets, and combinations thereof. Other suitable materials that may be used as foils and/or in combination with fabrics (e.g., as plating) include, for example and without limitation, nickel, aluminum, silver, copper, tin, alloys thereof, graphite, carbon, and combinations thereof.

Additionally or alternatively, electrically-conductive foams and rubbers can include, for example and without limitation, an inherently conductive core and/or a core with electrically-conductive materials embedded or infused within the core. Suitable examples include, without limitation, silver-filled silicone, electrically-conductive wires embedded in silicone, and electrically-conductive wires embedded in polyester fabric and/or nylon fabric.

Further, in some embodiments, the electrically-conductive conduit 830 includes a compressible knitted metal wire mesh gasket without a core (i.e., without a rubber or foam core). Suitable wires that may be used to construct a wire mesh gasket without a core include, for example and without limitation, copper clad steel, tin-plated copper clad steel, nickel-copper alloys (e.g., Monel), stainless steel, and aluminum.

The electrically-conductive conduit 830 may be connected to the impeller housing 808 using any suitable connection techniques, including, for example and without limitation, tacking, clamping, compression fit, adhesives, and combinations thereof. In the example embodiment, the electrically-conductive conduit 830 is connected to the impeller housing 808 by an electrically-conductive adhesive.

In some embodiments, the impeller housing 808 may be electrically connected to the ground circuit by an electrical connection other than electrically-conductive conduit 830. In some embodiments, for example, the edge plating 914 of the printed circuit board 828 may be raised or protrude radially outward from the peripheral edge 908 such that the edge plating 914 spans the gap 912 between the peripheral edge 908 and the motor housing sidewall 816. In such embodiments, the impeller housing 808 may be electrically connected to the edge plating 914 through the motor housing 802. For example, electrically-conductive tape (e.g., copper tape) may be applied to a circumferential section of the motor housing sidewall 816 and extend from the edge plating 914, over the motor housing sidewall 816, and to the impeller housing 808. Additionally or alternatively, the motor housing 802 may be metalized or otherwise plated in select areas that are in contact with the edge plating 914 and the impeller housing 808 such that, when the printed circuit board 828 is installed in the motor housing 802, the edge plating 914 contacts the metalized portions of the motor housing 802, thereby electrically connecting the edge plating 914 to the impeller housing 808.

In yet other embodiments, an electrically-conductive adhesive, such as room temperature vulcanizing (RTV) silicone, may be applied around the peripheral edge 908 to fill the gap 912 between the printed circuit board 828 and the motor housing sidewall 816. In such embodiments, a conductive tape or metalized motor housing, as described above, may be used to form the electrical connection between the edge plating 914 and the impeller housing 808.

In some embodiments, the motor assembly 800 may also include an electromagnetic shield, also referred to as a Faraday shield or cage, to further reduce or limit electromagnetic interference between the motor 804, controller 801, and external electromagnetic sources. For example, an electromagnetic shield can be electrically connected to the impeller housing 808, and extend around the motor assembly 800 such that the motor 804 and controller 810 are enclosed within an interior cavity or space defined by the electromagnetic shield.

Figure 14:
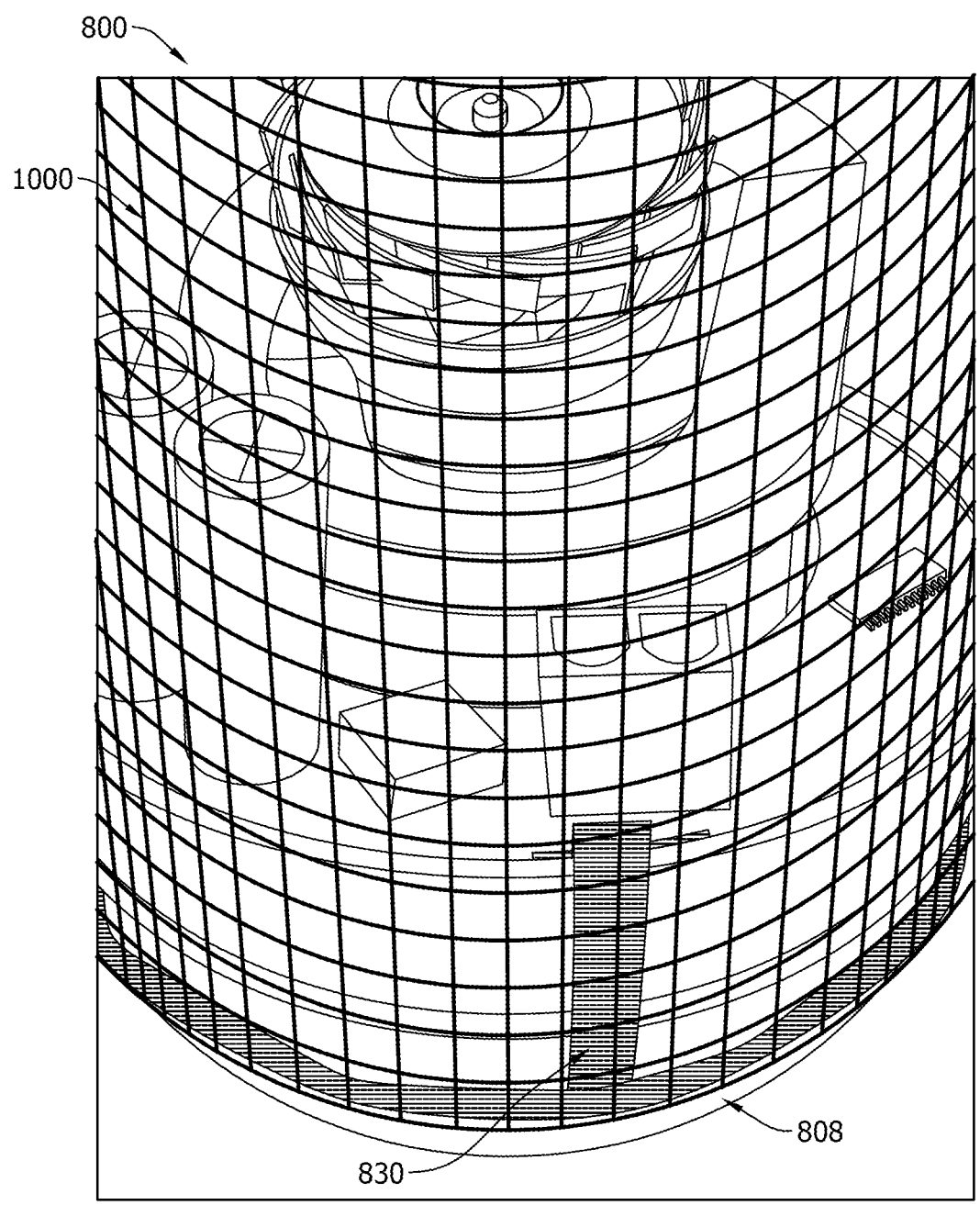
FIG. 14 is a perspective view of the motor assembly shown in FIG. 9 with an example electromagnetic shield connected thereto.
Figure 15:
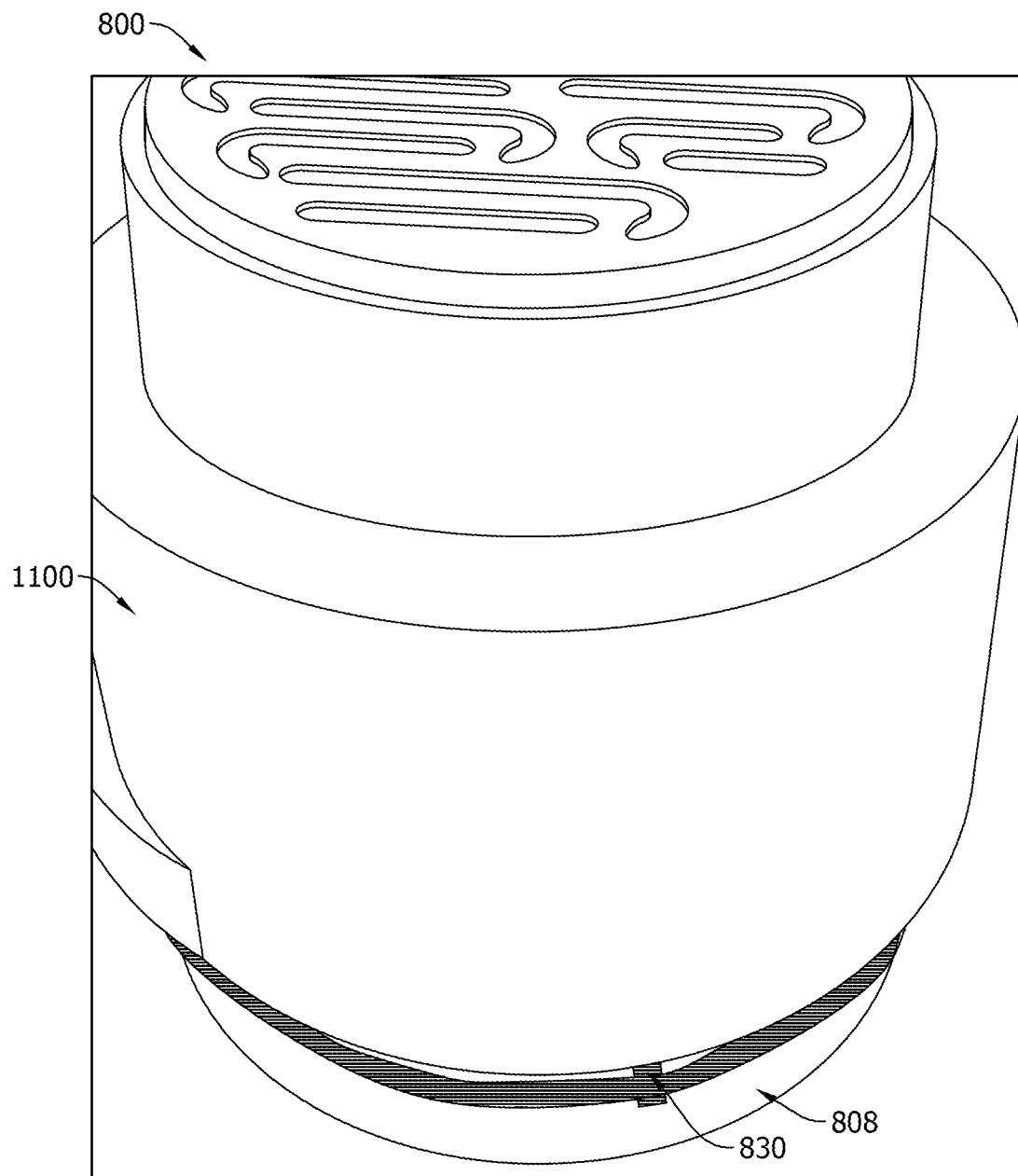
FIG. 15 is a perspective view of the motor assembly shown in FIG. 9 with another example electromagnetic shield connected thereto.

The electromagnetic shield may have any suitable construction that provides electromagnetic and/or magnetic field shielding of components of the motor assembly 800, such as the motor 804 and the controller 810. Suitable constructions for the electromagnetic shield include, for example and without limitation, metalized plastic, wire mesh, and cast or extruded metal. FIG. 14 illustrates an example electromagnetic shield 1000 in the form of a metal wire mesh connected to the motor assembly 800 shown in FIGS. 8 and 9. FIG. 15 illustrates another example electromagnetic shield 1100 in the form of a metallized plastic motor shield connected to the motor assembly 800 shown in FIGS. 8 and 9.

Electrically connecting the electromagnetic shield to the impeller housing 808, which is electrically connected to the ground circuit of the circuit board assembly 826, ensures that the electromagnetic shield is connected to the same reference circuit as the controller 810, motor 804, and impeller housing 808. The electromagnetic shield may be electrically connected to the impeller housing 808 using any suitable connection technique. In some embodiments, for example, the electromagnetic shield may be mechanically connected directly to the impeller housing 808 such that a direct electrical connection is formed between the impeller housing 808 and the electromagnetic shield. Additionally or alternatively, the electromagnetic shield may be connected to the impeller housing 808 by an electrical conduit, such as the flexible, compressible electrically-conductive conduit 830. As shown in FIG. 14, for example, the electrically-conductive conduit 830 that connects the edge plating 914 to the impeller housing 808 also connects the electromagnetic shield 1000 to the impeller housing 808. More specifically, the electrically-conductive conduit 830 is positioned between the impeller housing 808 and the electromagnetic shield 1000 such that when the electromagnetic shield 1000 is connected to the motor assembly 800, the electrically-conductive conduit 830 is compressed between the impeller housing 808 and the electromagnetic shield 1000.

As noted above, the electrically-conductive conduit 830 is compressible and has a relatively low hardness value (e.g., as compared to the motor housing 802, the printed circuit board 828, and the impeller housing 808). As a result, the electrically-conductive conduit 830 provides mechanical dampening between the impeller housing 808 and the electromagnetic shield, thereby dampening mechanical vibrations that would typically be transferred to the electromagnetic shield through a rigid electrical connection (e.g., a bolted or soldered connection). This, in turn, provides sound (noise) mitigation. More specifically, the relatively soft electrical connection provided by the electrically-conductive conduit 830 dampens the mechanical vibrations of the motor 804 and prevents mechanical vibrations from transferring out to the external electromagnetic shield and mounting enclosure, thereby reducing external nuisance sounds (e.g., noise due to vibration). This also reduces mechanical vibrations (e.g., pressure stress), and thereby helps prevent or reduce fatiguing the mechanical vacuum enclosure.

In some embodiments, the electromagnetic shield includes suitable air hole openings to allow air flow through the motor assembly 800. The illustrated motor assembly 800, for example, is a flow-through motor assembly. Accordingly, the electromagnetic shields 1000 and 1100 illustrated in FIGS. 14 and 15, respectively, include suitable air hole openings to allow air flow through the motor assembly 800.

The air hole openings in the electromagnetic shield are suitably sized and shaped to provide a balance between pressure drop due to airflow restriction and the attenuation capability of electromagnetic waves (e.g., per industry EMC/EMI requirements). In particular, larger air hole openings allow less airflow restriction, but lower the upper attenuation frequency of electromagnetic waves due to the slot antenna effect being a function of wavelength. Larger air hole openings equate to lower electromagnetic frequency attenuation because high frequency (i.e., smaller wavelength) waves can pass through the larger air hole openings. The strength of electromagnetic wave transmission is a function of wavelength in integer or fractional scalar of the fundamental frequency. The unique shielding combination of using several small holes (inherent with a wire mesh) rather than standard machined slots provides a balance between airflow restriction and high electromagnetic wave shielding (susceptibility and emissions). Using metalized plastic molded motor covers and formed metal mesh as electromagnetic shields provide an economical means of achieving EMC/EMI shielding requirements, and also provide mechanical dampening through use of flexible, compressible electrically-conductive conduits to provide the electrical connection between the edge plating 914, the impeller housing 808, and the electromagnetic shield.

Further, in some embodiments, the electromagnetic shield may also function as a flame arrestor. For example, the electromagnetic shield may be constructed to provide sufficient heat dissipation and/or absorption properties to extinguish flames, in the event such flames are generated within the motor assembly 800. The wire mesh electromagnetic shield 1000 illustrated in FIG. 14, for example, may inherently function as a flame arrestor, provided proper sealing exists at both the motor inlet and motor exhaust (i.e., the sealing surfaces of the inlet and outlet have no openings or voids larger than the minimum required to prevent flame propagation). Flame arresting in tandem with the EMC/EMI features of the motor assemblies described herein allow for a vacuum cleaner suitable and safe for industrial, utility, and process (refinery) environments meeting Hazardous Location requirements for all Classes I, II, and III and Divisions 1 & 2, as defined by the National Fire Protection Association (NFPA) Publication 70, National Electric Code® (NEC), Article 500 et seq.

Example embodiments of vacuum cleaning systems are described above in detail. The vacuum cleaning systems are not limited to the specific embodiments described herein, but rather, components of the vacuum cleaning systems may be used independently and separately from other components described herein. For example, the vacuum cleaner motor assemblies and associated features described herein may be used with a variety of vacuum cleaning systems, including and without limitation, vehicular or automotive vacuum cleaning systems, wet/dry vacuum cleaners, canister vacuum cleaners, and upright vacuum cleaners.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A vacuum cleaner comprising:
    a housing;
    a debris chamber defined within the housing; and
    a motor assembly connected to the housing and operable to generate airflow through the debris chamber, the motor assembly comprising:
        a motor;
        a motor housing including a sidewall at least partially defining a cavity;
        an impeller connected to the motor and operable to generate airflow upon operation of the motor;
        an impeller housing constructed of an electrically-conductive material, wherein the impeller is positioned within the impeller housing;
        a controller comprising a circuit board assembly positioned within the cavity, the circuit board assembly including a circuit board including a common circuit and a segment of conductive edge plating electrically connected to the common circuit;
        an electromagnetic shield enclosing at least one of the controller and the motor; and
        a flexible, compressible electrically-conductive conduit that extends from the segment of conductive edge plating to the impeller housing and the electromagnetic shield to electrically connect the impeller housing and the electromagnetic shield to the common circuit, wherein the electrically-conductive conduit is compressed between the segment of conductive edge plating and the sidewall of the motor housing, and between the electromagnetic shield and the sidewall of the motor housing.

2. The vacuum cleaner of claim 1, wherein the electromagnetic shield comprises a wire mesh.

3. The vacuum cleaner of claim 1, wherein the flexible, compressible electrically-conductive conduit comprises one of an electrically-conductive foam, an electrically-conductive rubber, a wire mesh gasket, and adhesive.

4. The vacuum cleaner of claim 1, wherein the circuit board further includes an outer peripheral edge, and wherein the segment of conductive edge plating is positioned along the outer peripheral edge.

5. The vacuum cleaner of claim 1, wherein the electrically-conductive conduit extends around the impeller housing.

6. The vacuum cleaner of claim 1, wherein the electrically-conductive conduit provides mechanical damping between the circuit board and the motor housing, and between the electromagnetic shield and the motor housing.

7. A motor assembly for a vacuum cleaner, the motor assembly comprising:
    a motor housing including a sidewall at least partially defining a cavity;
    a motor connected to the motor housing;
    an impeller connected to the motor and operable to generate airflow upon operation of the motor;
    an impeller housing constructed of an electrically-conductive material, wherein the impeller is positioned within the impeller housing;
    a controller comprising a circuit board assembly positioned within the cavity, the circuit board assembly including a circuit board including a common circuit and a segment of conductive edge plating electrically connected to the common circuit;
    an electromagnetic shield enclosing at least one of the controller and the motor; and
    a flexible, compressible electrically-conductive conduit that extends from the segment of conductive edge plating to the impeller housing and the electromagnetic shield to electrically connect the impeller housing and the electromagnetic shield to the common circuit, wherein the electrically-conductive conduit is compressed between the segment of conductive edge plating and the sidewall of the motor housing, and between the electromagnetic shield and the sidewall of the motor housing.

8. The motor assembly of claim 7, wherein the electromagnetic shield comprises a wire mesh.

9. The motor assembly of claim 7, wherein the flexible, compressible electrically-conductive conduit comprises one of an electrically-conductive foam, an electrically-conductive rubber, a wire mesh gasket, and adhesive.

10. The motor assembly of claim 7, wherein the circuit board further includes an outer peripheral edge, and wherein the segment of conductive edge plating is positioned along the outer peripheral edge.

11. The motor assembly of claim 7, wherein the electrically-conductive conduit extends around the impeller housing.

12. The motor assembly of claim 7, wherein the electrically-conductive conduit provides mechanical damping between the circuit board and the motor housing, and between the electromagnetic shield and the motor housing.

13. A method of assembling a motor assembly for a vacuum cleaner comprising:
    connecting a motor to a motor housing including a sidewall at least partially defining a cavity;
    connecting, to the motor, an impeller operable to generate airflow upon operation of the motor;
    positioning an impeller housing constructed of an electrically-conductive material around the impeller;
    positioning a controller comprising a circuit board assembly having a common circuit within the cavity, the circuit board assembly including a circuit board having a segment of conductive edge plating electrically connected to the common circuit;
    enclosing at least one of the controller and the motor within an electromagnetic shield; and
    electrically connecting the impeller housing and the electromagnetic shield to the common circuit through the segment of conductive edge plating via a flexible, compressible electrically-conductive conduit that extends from the segment of conductive edge plating to the impeller housing and the electromagnetic shield, wherein the electrically-conductive conduit is compressed between the segment of conductive edge plating and the sidewall of the motor housing and between the electromagnetic shield and the sidewall of the motor housing.

14. The method of claim 13, wherein the circuit board further includes an outer peripheral edge, and wherein the segment of conductive edge plating is positioned along the outer peripheral edge.

15. The method of claim 13, wherein the electrically-conductive conduit extends around the impeller housing.

16. The method of claim 13, wherein the electrically-conductive conduit provides mechanical damping between the circuit board and the motor housing, and between the electromagnetic shield and the motor housing.

17. The method of claim 13, wherein the electrically-conductive conduit comprises one of an electrically-conductive foam, an electrically-conductive rubber, a wire mesh gasket, and adhesive.

* * * * *